US007688958B2

(12) United States Patent
Dolan et al.

(10) Patent No.: US 7,688,958 B2
(45) Date of Patent: Mar. 30, 2010

(54) METHODS AND APPARATUS FOR PROVIDING EXPANDED TELECOMMUNICATIONS SERVICE

(75) Inventors: Robert A. Dolan, Santa Barbara, CA (US); David F. Hofstatter, Santa Barbara, CA (US); Lee Kirchhoff, Santa Barbara, CA (US)

(73) Assignee: Callwave, Inc., Santa Barbara, CA (US)

( * ) Notice: Subject to any disclaimer, the term of this patent is extended or adjusted under 35 U.S.C. 154(b) by 1440 days.

(21) Appl. No.: 11/039,374

(22) Filed: Jan. 19, 2005

(65) Prior Publication Data

US 2005/0207557 A1    Sep. 22, 2005

Related U.S. Application Data

(63) Continuation-in-part of application No. 10/255,567, filed on Sep. 26, 2002, now Pat. No. 6,898,275, which is a continuation of application No. 09/539,375, filed on Mar. 31, 2000, now Pat. No. 6,477,246.

(51) Int. Cl.
*H04M 1/56* (2006.01)
*H04M 15/06* (2006.01)
*H04M 3/42* (2006.01)

(52) U.S. Cl. .............. 379/142.02; 379/142.06; 379/201.11; 379/210.03

(58) Field of Classification Search ........ 379/142.01, 379/142.02, 142.05, 142.07, 142.15, 142.16, 379/201.11, 207.02, 207.13, 210.02, 210.03, 379/211.02, 88.02, 88.12, 88.13, 88.17, 88.19, 379/88.2
See application file for complete search history.

(56) References Cited

U.S. PATENT DOCUMENTS 3,936,613 A   2/1976  Nishigori et al.
3,956,595 A   5/1976  Sobanski
4,009,337 A   2/1977  Sakai et al.
4,022,983 A   5/1977  Braun et al.
4,485,470 A   11/1984 Reali
4,736,405 A   4/1988  Akiyama
4,809,321 A   2/1989  Morganstein et al.
4,893,336 A   1/1990  Wuthnow
4,994,926 A   2/1991  Gordon et al.
5,040,208 A   8/1991  Jollssaint (Continued)

FOREIGN PATENT DOCUMENTS

CA      1329852     5/1994

(Continued)

OTHER PUBLICATIONS

Johnson, Dave, "Now You're Talking-voice-response systems for home offices—Product Information"; *Home Office Computing;* http://www.findarticles.com; Feb. 1999.

*Primary Examiner*—Quoc D Tran
(74) *Attorney, Agent, or Firm*—Knobbe, Martens, Olson & Bear LLP

(57) ABSTRACT

The present invention relates to telephone call processing. In one embodiment, a call processing system receives from a caller a first call for a user, the first call including call signaling information. The call processing system determines whether the call signaling information includes caller identification information and whether the call signaling information indicates that the caller identification information is restricted. If the caller identification information is restricted, the call processing system instructs the caller to take a first action so that the caller identification information can be provided to the user. The call processing system determines whether the caller has performed the first action during the first call, and if the caller has performed the first action during the first call, the call processing system provides at least a portion of the caller identification information to the user.

59 Claims, 18 Drawing Sheets

U.S. PATENT DOCUMENTS

| | | |
|---|---|---|
| 5,046,087 A | 9/1991 | Sakai |
| 5,291,302 A | 3/1994 | Gordon et al. |
| 5,404,537 A | 4/1995 | Olnowich et al. |
| 5,434,908 A | 7/1995 | Klein |
| 5,459,584 A | 10/1995 | Gordon et al. |
| 5,467,388 A | 11/1995 | Redd, Jr. et al. |
| 5,526,524 A | 6/1996 | Madduri |
| 5,533,102 A | 7/1996 | Robinson et al. |
| 5,577,111 A | 11/1996 | Iida et al. |
| 5,583,918 A | 12/1996 | Nakagawa |
| 5,619,557 A | 4/1997 | Van Berkum |
| 5,640,677 A | 6/1997 | Karlsson |
| 5,651,054 A | 7/1997 | Dunn et al. |
| 5,668,861 A | 9/1997 | Watts |
| 5,751,795 A | 5/1998 | Hassler et al. |
| 5,774,067 A | 6/1998 | Olnowich et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,894,504 A | 4/1999 | Alfred et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,995,594 A | 11/1999 | Shaffer et al. |
| 5,995,603 A | 11/1999 | Anderson |
| 6,014,436 A | 1/2000 | Florence et al. |
| 6,032,051 A | 2/2000 | Hall et al. |
| 6,034,956 A | 3/2000 | Olnowich et al. |
| 6,035,031 A | 3/2000 | Silverman |
| 6,044,059 A | 3/2000 | Olnowich |
| 6,078,581 A | 6/2000 | Shtivelman et al. |
| 6,104,800 A | 8/2000 | Benson |
| 6,144,644 A | 11/2000 | Bajzath et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,178,183 B1 | 1/2001 | Buskirk, Jr. |
| 6,181,691 B1 | 1/2001 | Markgraf et al. |
| 6,208,638 B1 | 3/2001 | Rieley et al. |
| 6,212,261 B1 | 4/2001 | Meubus et al. |
| 6,230,009 B1 | 5/2001 | Holmes et al. |
| 6,243,378 B1 | 6/2001 | Olnowich |
| 6,253,249 B1 | 6/2001 | Belzile |
| 6,278,704 B1 | 8/2001 | Creamer et al. |
| 6,304,565 B1 | 10/2001 | Ramamurthy |
| 6,310,939 B1 | 10/2001 | Varney |
| 6,350,066 B1 | 2/2002 | Bobo, II |
| 6,353,660 B1 | 3/2002 | Burger et al. |
| 6,353,663 B1 | 3/2002 | Stevens et al. |
| 6,363,414 B1 | 3/2002 | Nicholls et al. |
| 6,405,035 B1 | 6/2002 | Singh |
| 6,411,601 B1 | 6/2002 | Shaffer et al. |
| 6,411,805 B1 | 6/2002 | Becker et al. |
| 6,438,216 B1 | 8/2002 | Aktas |
| 6,438,222 B1 | 8/2002 | Burg |
| 6,477,246 B1 * | 11/2002 | Dolan et al. ............ 379/211.02 |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,539,084 B1 | 3/2003 | Long |
| 6,542,596 B1 * | 4/2003 | Hill et al. ............... 379/207.02 |
| 6,546,087 B2 | 4/2003 | Shaffer et al. |
| 6,549,612 B2 | 4/2003 | Gifford et al. |
| 6,553,110 B1 * | 4/2003 | Peng ..................... 379/210.03 |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omari et al. |
| 6,574,319 B2 | 6/2003 | Latter et al. |
| 6,621,892 B1 | 9/2003 | Banister et al. |
| 6,643,034 B1 | 11/2003 | Gordon et al. |
| 6,662,232 B1 | 12/2003 | Nicholls et al. |
| 6,690,785 B1 | 2/2004 | Stelter et al. |
| 6,721,408 B1 | 4/2004 | Bain et al. |
| 6,748,058 B1 * | 6/2004 | Schwend et al. ......... 379/88.21 |
| 6,751,299 B1 | 6/2004 | Brown et al. |
| 6,782,088 B1 | 8/2004 | Gabara et al. |
| 6,785,021 B1 | 8/2004 | Gordon et al. |
| 6,792,094 B1 | 9/2004 | Kirkpatrick |
| 6,857,074 B2 | 2/2005 | Bobo, II |
| 6,898,275 B2 * | 5/2005 | Dolan et al. ........... 379/211.02 |
| 6,968,174 B1 | 11/2005 | Trandal et al. |
| 6,999,572 B1 * | 2/2006 | Shaffer et al. .......... 379/210.01 |
| 7,003,087 B2 | 2/2006 | Spencer et al. |
| 7,231,029 B1 * | 6/2007 | Kirkpatrick ............ 379/210.02 |
| 7,397,910 B2 * | 7/2008 | Dolan et al. ........... 379/211.02 |
| 2002/0010616 A1 | 1/2002 | Itzhaki |
| 2002/0097710 A1 | 7/2002 | Burg |
| 2003/0039339 A1 | 2/2003 | Luehrig et al. |
| 2003/0156700 A1 | 8/2003 | Brown et al. |
| 2004/0028203 A1 | 2/2004 | Wurster et al. |
| 2004/0141598 A1 * | 7/2004 | Moss et al. ............... 379/88.19 |
| 2004/0190706 A1 | 9/2004 | Fleischer, III et al. |
| 2004/0258220 A1 | 12/2004 | Levine et al. |
| 2005/0053216 A1 | 3/2005 | Spencer et al. |
| 2005/0123118 A1 | 6/2005 | Terry et al. |
| 2005/0201534 A1 * | 9/2005 | Ignatin ..................... 379/88.22 |
| 2005/0207556 A1 | 9/2005 | Gonzalez et al. |
| 2006/0013374 A1 | 1/2006 | Fleisher, III et al. |
| 2006/0227957 A1 * | 10/2006 | Dolan et al. ........... 379/212.01 |

FOREIGN PATENT DOCUMENTS

| | | |
|---|---|---|
| EP | 1 120 954 | 8/2001 |
| JP | 10-107901 | 4/1998 |
| JP | 10-322462 | 12/1998 |
| JP | 10-322465 | 12/1998 |
| WO | WO 97/26749 | 7/1997 |
| WO | WO 98/36551 | 8/1998 |
| WO | WO 99/14924 | 3/1999 |
| WO | WO 00/06084 | 10/2000 |
| WO | WO 01/76210 | 10/2001 |

* cited by examiner

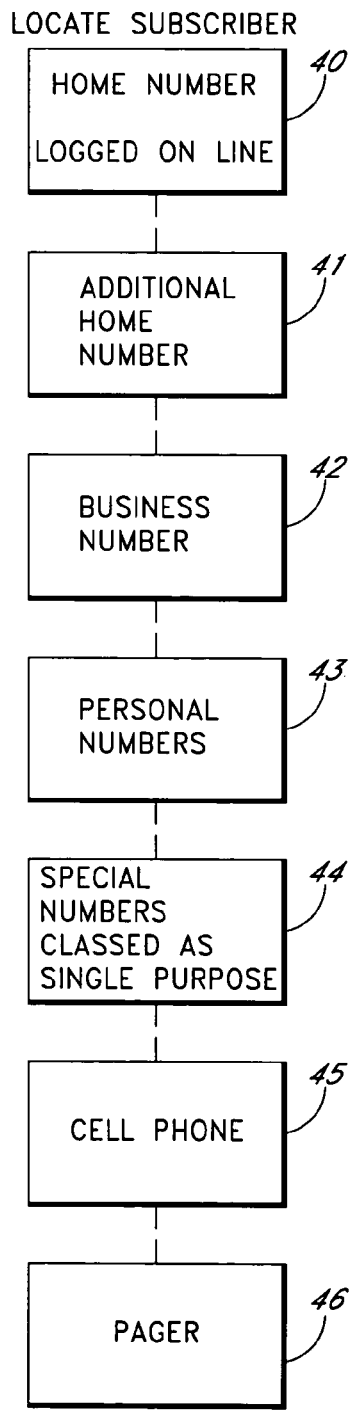
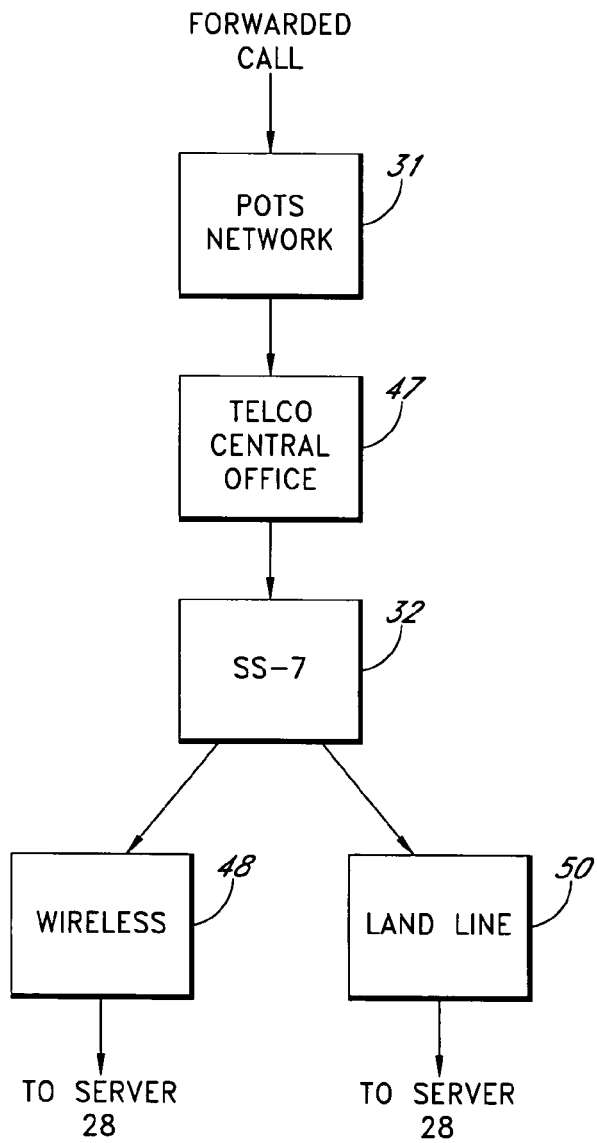
FIG. 5
FIG. 6

US 7,688,958 B2

METHODS AND APPARATUS FOR PROVIDING EXPANDED TELECOMMUNICATIONS SERVICE

PRIORITY CLAIM

The present application is a continuation-in-part of U.S. application Ser. No. 10/255,567, filed Sep. 26, 2002 U.S. Pat. No. 6,898,275, which is a continuation of U.S. application Ser. No. 09/539,375, filed Mar. 31, 2000, now U.S. Pat. No. 6,477,246, the entirety of which are incorporated herein by reference in its entirety.

BACKGROUND OF THE INVENTION

1. Field of the Invention

The present invention relates generally to telecommunications, and more particularly to telephone call processing.

2. Description of the Related Art

Many telephone subscribers have a personal computer on their desk and frequently the personal computer is logged in to the same telephone line that would normally be used by the telephone. This is for use of the computer on the Internet. Frequently, incoming telephone calls receive a busy signal because the computer is logged on to the Internet. Thus there are many lost calls. Many individuals and small businesses are searching for ways to simplify and control their telecommunications systems. Many of them are reluctant to acquire additional telephone lines at current prices.

Most telecommunications systems today have limited intelligence. Many calls end in voice mail, an often unsatisfactory conclusion. With respect to business calls, calls not completed may result in irritated customers and lost sales.

In addition, many telephone subscribers have caller ID blocking on their line in order to prevent call recipient from viewing the caller's number using a caller ID display. However, many call recipients have set-up their phone lines so that calls having caller ID blocking will not ring through to the called party's phone. Then, in many conventional systems, if a caller with caller ID blocking calls, a prompt will be played to the caller informing the caller that the called party will not accept calls with caller ID blocking, and that the caller needs to first hang up, and place a new call by entering and unblocking code, and then entering the called number again to unblock the caller's phone number. Disadvantageously, this is a time consuming, and for some, a confusing procedure.

SUMMARY OF THE INVENTION

The present invention relates generally to telecommunications, and more particularly to telephone call processing.

By way of example, in one embodiment, when an incoming call comes in, a call processing system may prompt a caller to unblock the caller's telephone number before proceeding with recording a message from the caller and/or forwarding the caller call. In this example embodiment, the caller is not required to first hang up, then take the phone off hook, enter an unblocking code, and then dial the called number again to unblock the caller's phone number and place the call in order to unblock the caller ID. Instead, a caller can change the caller ID designation from 'private' or restricted, to 'not private' or restricted during the call, thereby unblocking the caller ID, so that the caller does not have to place a new call to unblock the caller ID.

One embodiment provides a method of processing calls having caller ID blocking, the method comprising: receiving from a caller a first call, the first call including call signaling information, at a call processing system; determining whether the call signaling information includes caller ID information; if the caller ID information is private, during the first call instructing the caller to take a first action to unblock the caller ID information for the first call; and after the caller has performed the first action during the first call, providing at least a portion of the caller ID information to the called party.

Another embodiment provides a method of processing calls having private caller identification information, the method comprising: receiving an indication from a user as to whether the user requires or requests caller identification information, and storing the indication in a data store; receiving from a caller a first call for the user, the first call including call signaling information; determining whether the call signaling information includes caller identification information; determining whether the call signaling information indicates that the caller identification information is private; retrieving the user indication from the data store; if the caller identification information is private and the retrieved user indication indicates that the user requests caller identification information, informing the caller that the caller requests caller identification information and instructing the caller to take a first action to allow the caller identification information to be provided to the user; if the caller identification information is private and the retrieved user indication indicates that the user requires caller identification information, informing the caller that the caller requires caller identification information and instructing the caller to take a first action to allow the caller identification information to be provided to the user; determining whether the caller has performed the first action during the first call; and if the caller has performed the first action during the first call, providing at least a portion of the caller identification information to the user.

Still another embodiment provides a method of processing calls having private caller identification information, the method comprising: receiving from a caller a first call for a user, the first call including call signaling information; determining whether the call signaling information includes caller identification information; determining whether the call signaling information indicates that the caller identification information is restricted; if the caller identification information is restricted, instructing the caller to take a first action so that the caller identification information can be provided to the user; determining whether the caller has performed the first action during the first call; and if the caller has performed the first action during the first call, providing at least a portion of the caller identification information to the user.

Yet another embodiment provides a method of processing calls having private caller identification information, the method comprising: receiving from a caller a first call for a user, the first call including call signaling information; if the caller identification information associated with the first call is blocked, instructing the caller to unblock the caller identification information during the first call; and after the caller has unblocked the caller identification information during the first call, performing a call processing action with respect to the first call.

One embodiment provides a computer readable medium having code stored thereon that, when executed, causes a computer to: receive signaling information associated with a first call from a caller for a user; if the caller identification information associated with the first call is blocked, instruct the caller to unblock the caller identification information during the first call; and after the caller has unblocked the caller identification information during the first call, perform a call processing action with respect to the first call.

BRIEF DESCRIPTION OF THE DRAWINGS

FIG. 5 is the process of locating the subscriber.
FIG. 6 is an expansion of FIG. 3 showing how a Telco central office can be connected by way of wireless connections or by way of land line connections to the server.

DETAILED DESCRIPTION OF PREFERRED EMBODIMENTS

Figure 1:
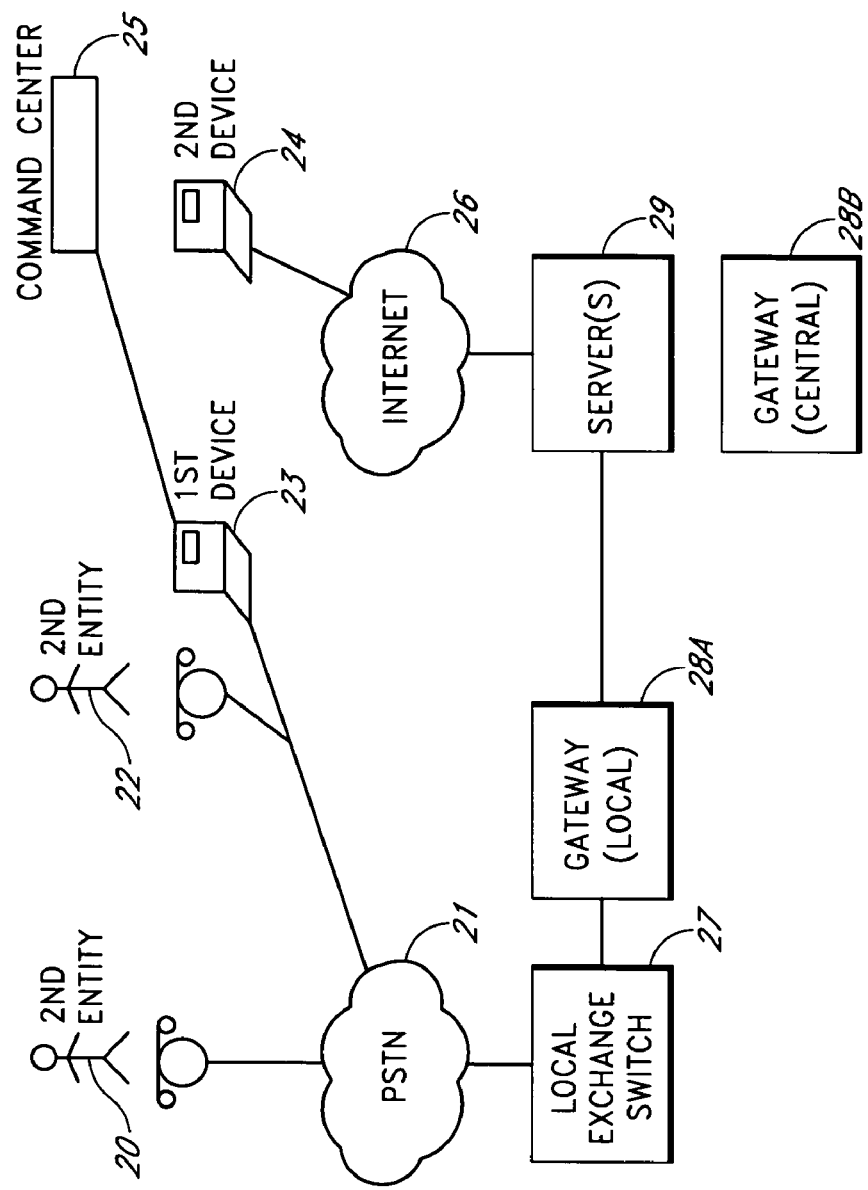
FIG. 1 is a schematic representation of one embodiment of the present invention.

FIG. 1 is a schematic representation of the organization of one embodiment of the present invention. FIG. 1 shows a first entity 20 connected to the Public Switched Telephone Network (PSTN) 21. A second entity 22 is also connected to the PSTN 21. The second entity 22 is illustrated as having a first device 23 indirectly connected to the Internet 26 through a PSTN 21 provided dial-up connection shared with the telephone of the second entity 22. The second entity 22 is also shown to have a second device 24 directly connected to the Internet 26. Both devices host a software based Command Center 25. The devices may or may not be logged onto the Internet 26. FIG. 1 also shows a local exchange switch 27 connected to the PSTN 21. The system directs the call and the call information of the first entity 20 through the PSTN 21 to the local exchange switch 27 and then to a gateway 28; said gateway can be implemented as a local gateway 28A near the switching system 27 or a centralized gateway 28B near the server 29. The gateway forwards the call information to the Server (or array of Servers) 29 which then communicates to the Command Center 25 over an Internet Protocol connection that is by a plurality of means, including a single phone line dial up connection (e.g. as shown in the case of the first device 23) an always on landline home connection (for example as shown in the case of the second device 24) an always on landline office connection or an always on wireless connection. The Server 29 and the Command Center 25 then interact to coordinate the dialog with the first entity 20 over the PSTN 21 and the second entity 22 over the appropriate device 23 or 24.

Figure 2:
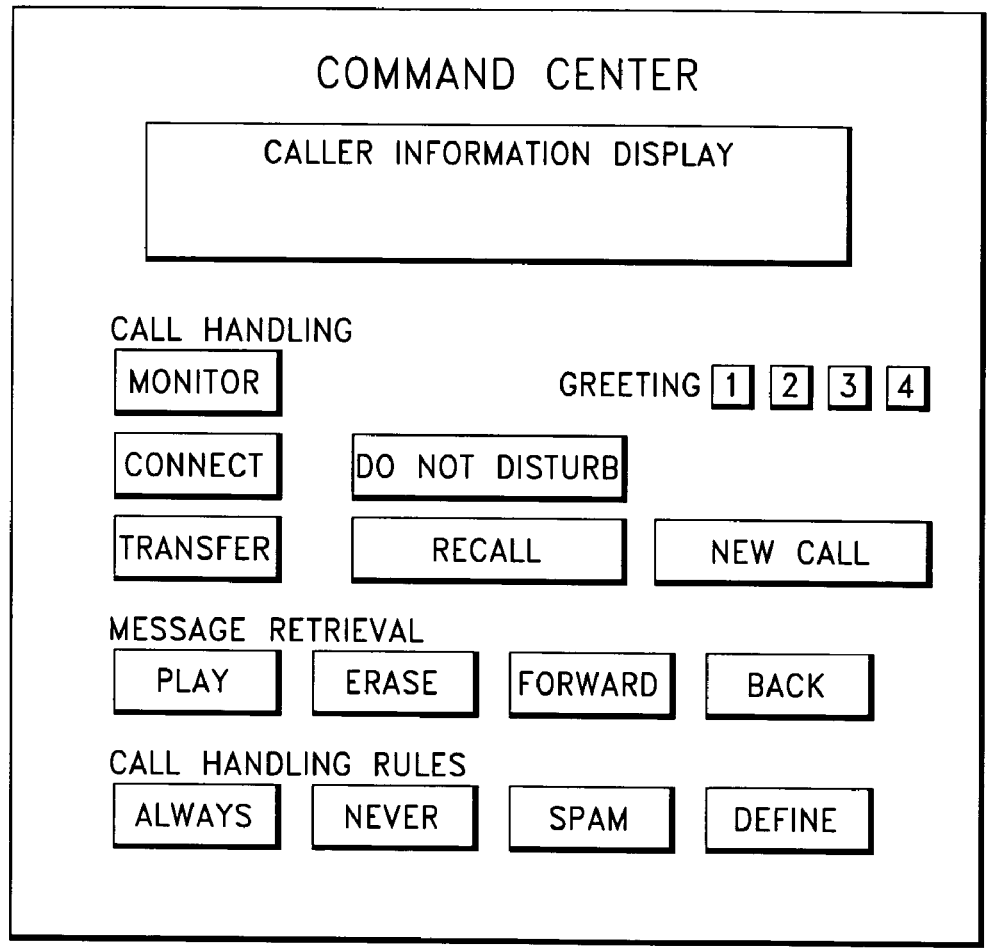
FIG. 2 is an example of a typical screen for a control panel.

Referring now to FIG. 2 of the drawings, an example of a typical screen for command center 25 a control panel is shown. It should be understood that the control panel may have messages on it other than the ones shown in the figure. The control panel of FIG. 2 would typically show up in a small area of the monitor screen of the subscriber's device desktop (e.g. computer) 23 & 24. For example, the control panel of FIG. 2 may occupy only a 1 inch by 2 inch corner of the screen. The control panel of FIG. 2 displays status of the incoming call and allows the second entity 22 to coordinate interactions with the server 29. The command center interface supports a plurality of call control inputs including a) no input b) transfer call over circuit switching network c) take call over Internet Protocol d) reoriginate the call over circuit switched or Internet Protocol network e) have the server interact with the caller to provide information or record the audible signal.

Figure 3:
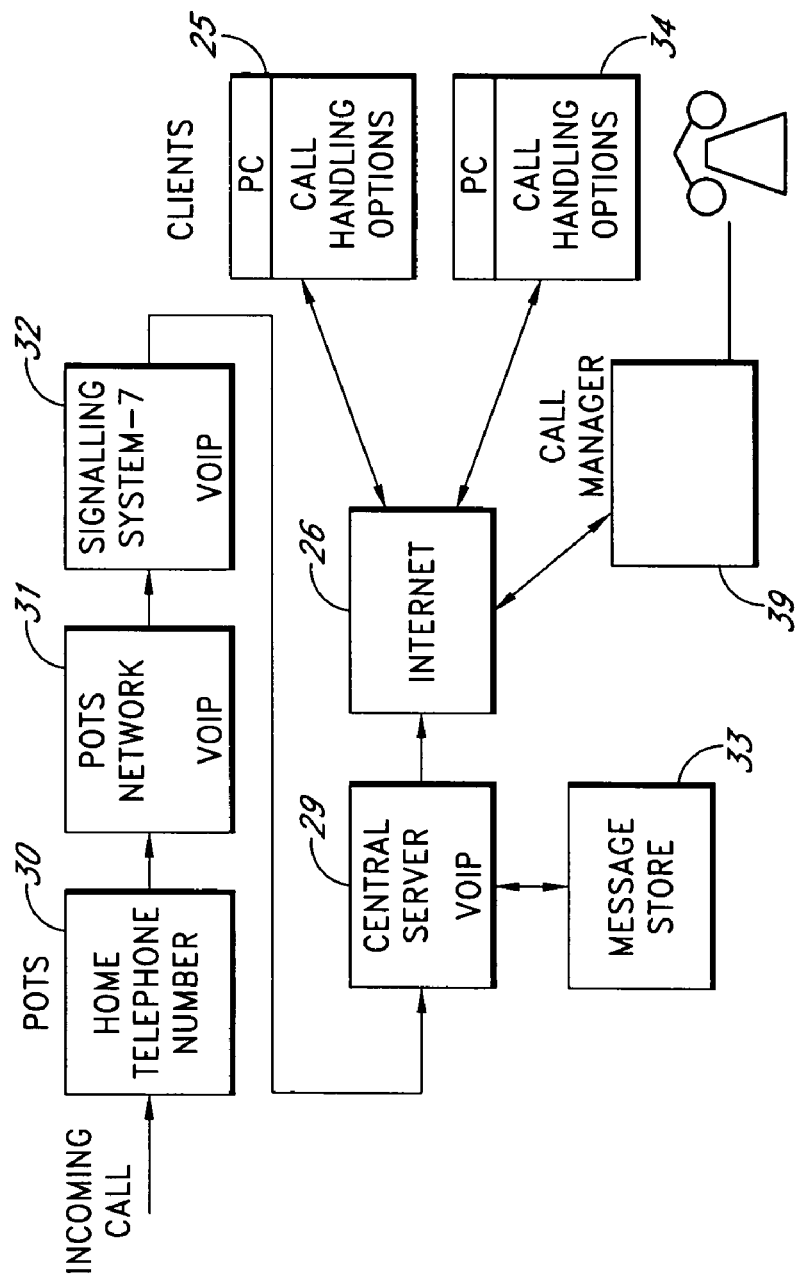
FIG. 3 is a more detailed version of the communication path of the system of the present invention.

Referring now to FIG. 3 of the drawings, there is shown a more detailed version of the communication path of the system of the present invention. An incoming call is illustrated as being directed to a home telephone number 30 in the Plain Old Telephone System (POTS) which is passed on to the POTS Network 31. The POTS Network 31 is shown connected to a Signaling System 7 (SS7) 32. The telephone system employs what is known as Common Channel Signaling (CCS). This is a signaling system used in telephone networks that separates signaling information from user data. A specified channel is exclusively designated to carry signaling information for all other channels in the system. The SS7 32 is one of the standard CCS systems used by the telephone company. The SS7 32 is connected to the central server 28. The SS7 32 normally connects between central offices. Because the present invention uses the SS7 32, it appears to be a central office to the telephone companies. The system can be or act as a class 5 telephone office. A message store memory 33 is located at the central server 29 for storing messages. The central server 29 communicates through the internet 26 to the personal desktop computer 25 of the client. The central server 29 is shown as also communicating to a second client having a personal desktop computer 34. A call merger 39 connects from the Internet 26 to a telephone instrument.

When an incoming call comes in to the home telephone number 30, the central server 29 interacts with the caller. It makes a record of the caller's telephone number or prompts the caller to unblock the telephone so as to give the caller's telephone number. The central server 29 may give the caller options that can be answered by a touch tone response, or it may ask for a voice message to be passed on to the subscriber. If an audio message is given to the central server 29, that message is passed along using Voice Over IP (VOIP) which is used in the telephone system and over the internet. The letters IP stand for Internet Protocol.

Teleconferencing over the internet is done using a standard developed by the International Telecommunications Union (ITU). This standard is known as ITU-T H.323. This provides for audio and video in a teleconferencing context. From the standpoint of VOIP, the video component of the teleconferencing signal is ignored and only the audio is used. This permits audio to be transferred from the incoming call at the home telephone number 30 to the client's personal desktop computer 25. The client can listen to the message from the incoming call before making a decision as to the handling of the call. The server communicates to a command center running on a multiplicity of platforms and providing a control interface to the second entity. The command center is a software and device solution that can be hosted alternatively on a personal computer, a handheld computing device, a wireless telephone, a television, a web interface appliance, or a command center server using voice and DTMF tone interaction with a telephone device.

Figure 4:
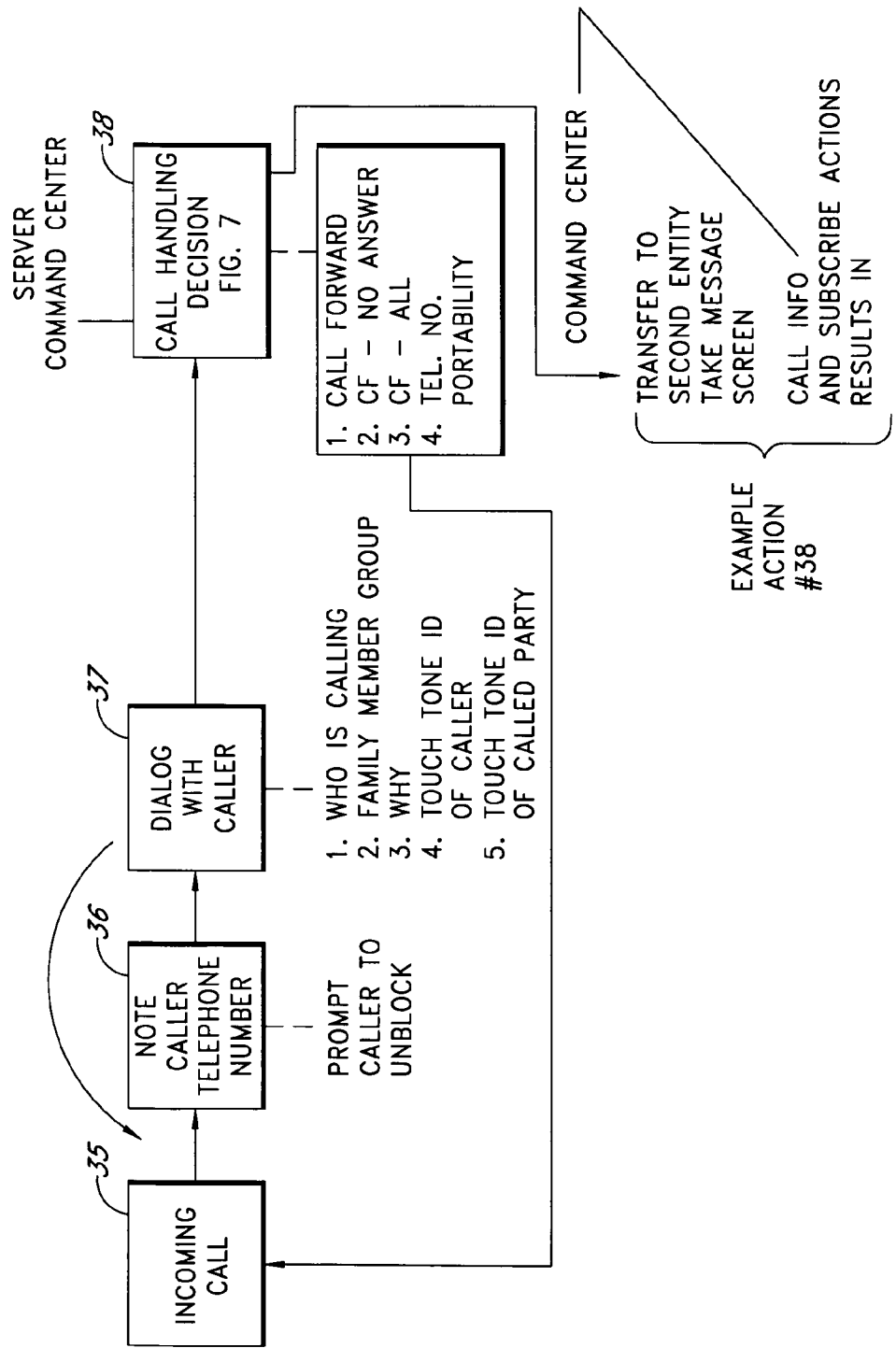
FIG. 4 is a schematic diagram of the call handling process.

Referring now to FIG. 4, there is shown a schematic diagram of the call handling process. Box 35 indicates the arrival of an incoming call. The options may include forward the call, call forward no-answer, forward the call always, and it may provide for switching the call to a different telephone number, for example that of a cell phone or other device. The caller may be presented with voice mail type options. For example, if you wish to talk with Mr. Jones, press 1, if you wish to talk with Mrs. Jones press 2, if you wish to talk with Susie Jones press 3. The caller may be required to give a touch tone ID, or to provide a touch tone ID of the called party. The dialog process is for the purpose of obtaining as much information as possible as to who is calling, which family member is being called, and why. The caller may be asked to speak a message into the telephone as would be done with an answering machine. This message is recorded and passed on to the subscriber so that he can listen to it to aid him in making the call handling decision. As shown at box 37, the caller's telephone number is noted by the central server 29, or the caller is prompted to unblock the telephone number. Box 36 indicates that a dialog is conducted by the central server 29 with the caller. Box 38 shows the call handling decision. The system identifies the first entity by the following methods: detecting caller ID and or called number information from the call information received from the switch, by means of voice prompts from the system and tone response from the first entity by which the first entity identifies their number, or the person whom they are calling, or by means of capturing an audible signal from the first entity.

The central server 29 may go through a process of locating the subscriber. This is illustrated in FIG. 5. This service is sometimes referred to as find me/follow me. As indicated in FIG. 5, the subscriber may have his home number logged on line for the Internet as indicated in block 40. However, the subscriber may have an additional home number as shown in block 41 or the subscriber may have a business number as shown in block 42. The subscriber may have a personal number as in block 43, or a special number classed as a single purpose number as in block 44. In addition the subscriber may have a cell phone 45 or a pager 46.

It should be understood that as the central server 29 goes through the processes of locating the subscriber, the caller is not aware of any of the procedures that the central server 28 is going through. The caller is unaware of any of the special numbers that the subscriber may have, or equipment such as pagers or cell phones.

It is not necessary for the equipment used by the system such as the central server 29 to be located close to the subscriber or close to the called number. For example, as shown in FIG. 6, the POTS Network 31 can be connected through a Telco central office 47 via the SS7 32 by way of wireless connections 48 or by way of land line connections 50 to the server 29 at a remote location.

Figure 7:
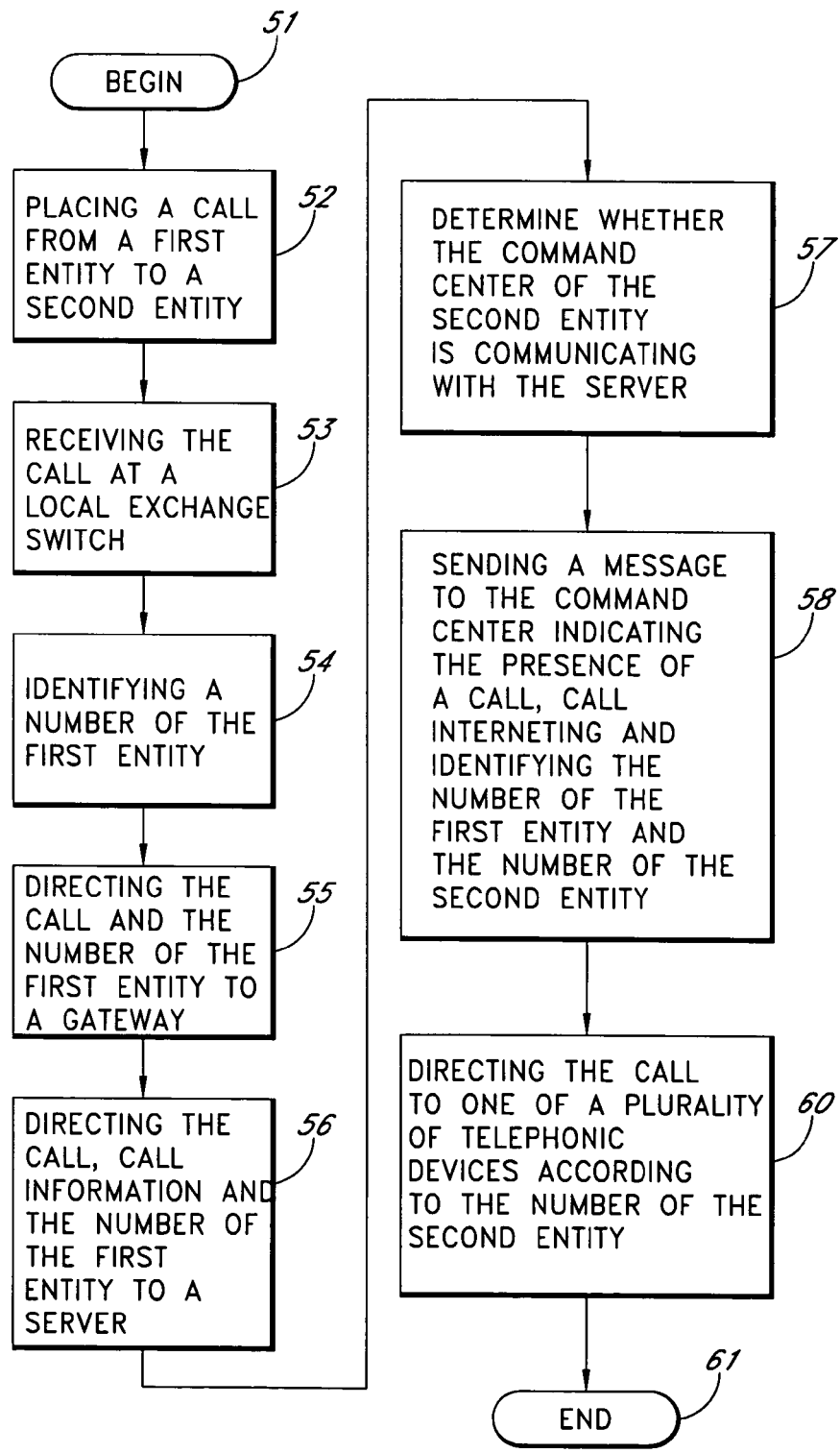
FIG. 7 is a sequence of steps on a flow chart indicating the handling of a call.

It should be understood that the message store memory 33 shown in FIG. 3 may include a list of numbers that the subscriber wishes to speak to always. These may be family members, or business partners, or the like. These may be added to at the subscriber's discretion. Other instructions for call handling may be recorded in the message store memory 33. One of the first things done by the central server 29 is to check to see if there are special instructions for handling of a given incoming call. FIG. 7 shows a sequence of steps on a flow chart indicating the handling of a call. The first box 51 is "begin". Box 52 is "placing a call from a first entity to a second entity". Box 53 is "receiving the call at a local exchange switch". The next step is shown in box 54 as "identifying a number of the first entity". Box 55 is "directing the call and the number of the first entity to a gateway". Box 56 is "directing the call, call information, and the number of the first entity to a server". Box 57 is "determining whether the Command Center of the second entity is communicating with the server". Box 58 is "sending a message to the Command Center indicating the presence of a call and identifying the number of the first entity and the number of the second entity". Box 60 is "directing the call to one of a plurality of telephonic devices according to the number of the second entity" and the last block on FIG. 7 is box 61 "end".

Figure 8:
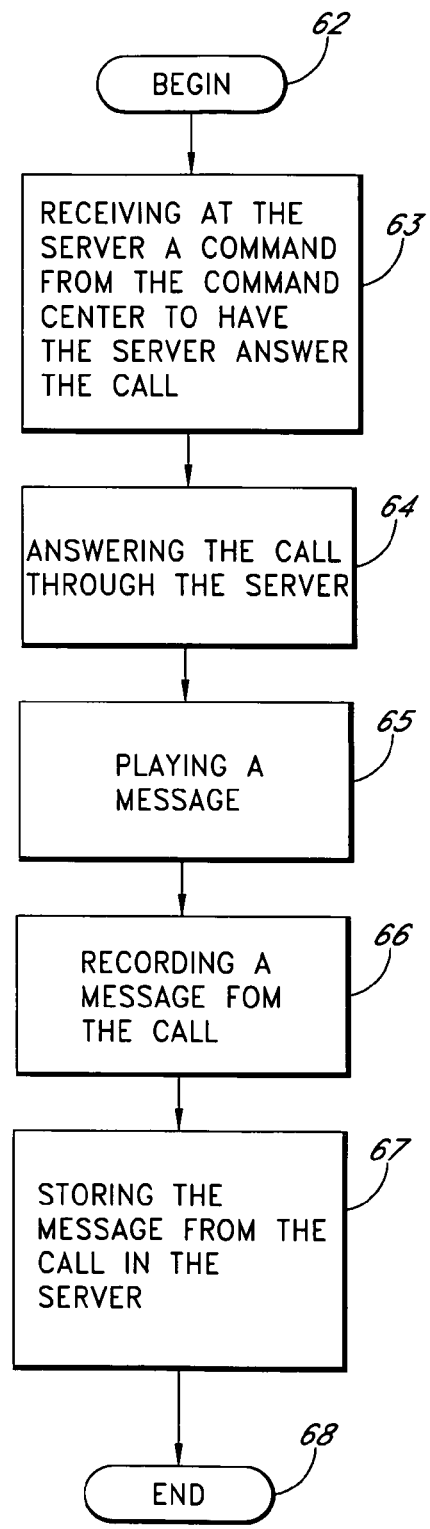
FIG. 8 is a flow chart showing a series of steps in the handling of incoming telephone calls.

FIG. 8 is a flow chart showing a series of steps in the handling of incoming telephone calls. The first block 62 is "begin". Block 63 is "receiving at the server a command from the command center to have the server answer the call". Block 64 is "answering the call through the server". Block 65 is "playing a message". Block 66 is "recording a message from the call". Block 67 is "storing the message from the call in the server". The last block is 68 "end".

Figure 9:
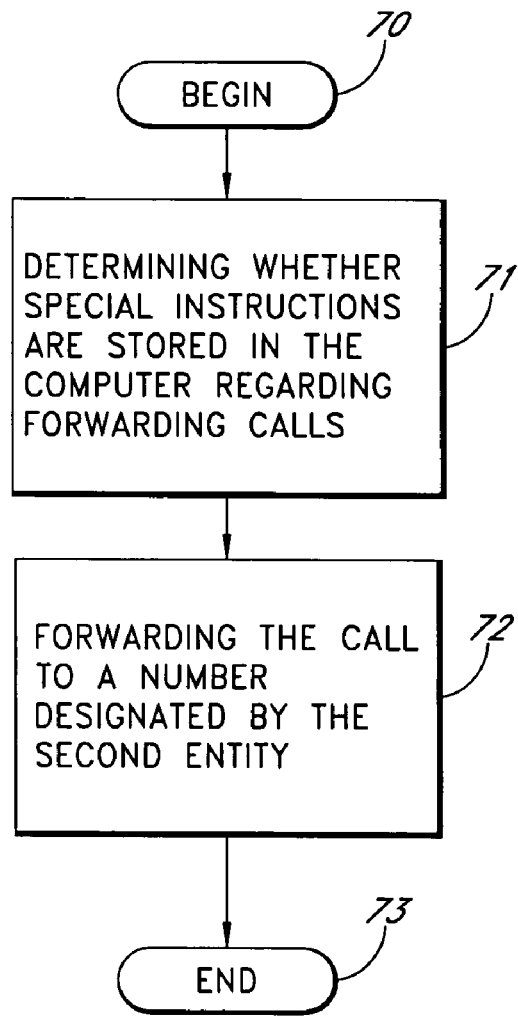
FIG. 9 is a flow chart illustrating further steps in the call handling flow chart.

FIG. 9 is a flow chart illustrating further steps in the call handling flow chart. The first block 70 is "begin". Block 71 is "determining whether special instructions are stored in the computer regarding forwarding calls". Block 72 is "forwarding the call to a number designated by the second entity". Block 73 is "end".

Figure 10:
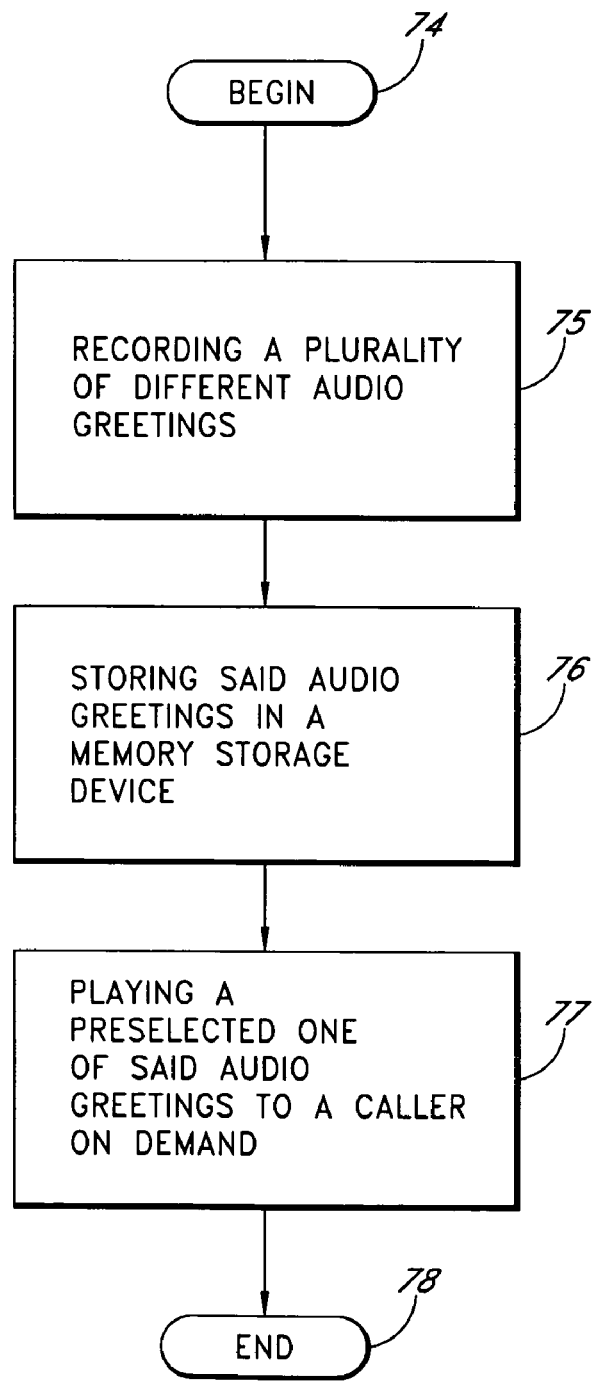
FIG. 10 is a sequence of steps in a flow chart.
Figure 11:
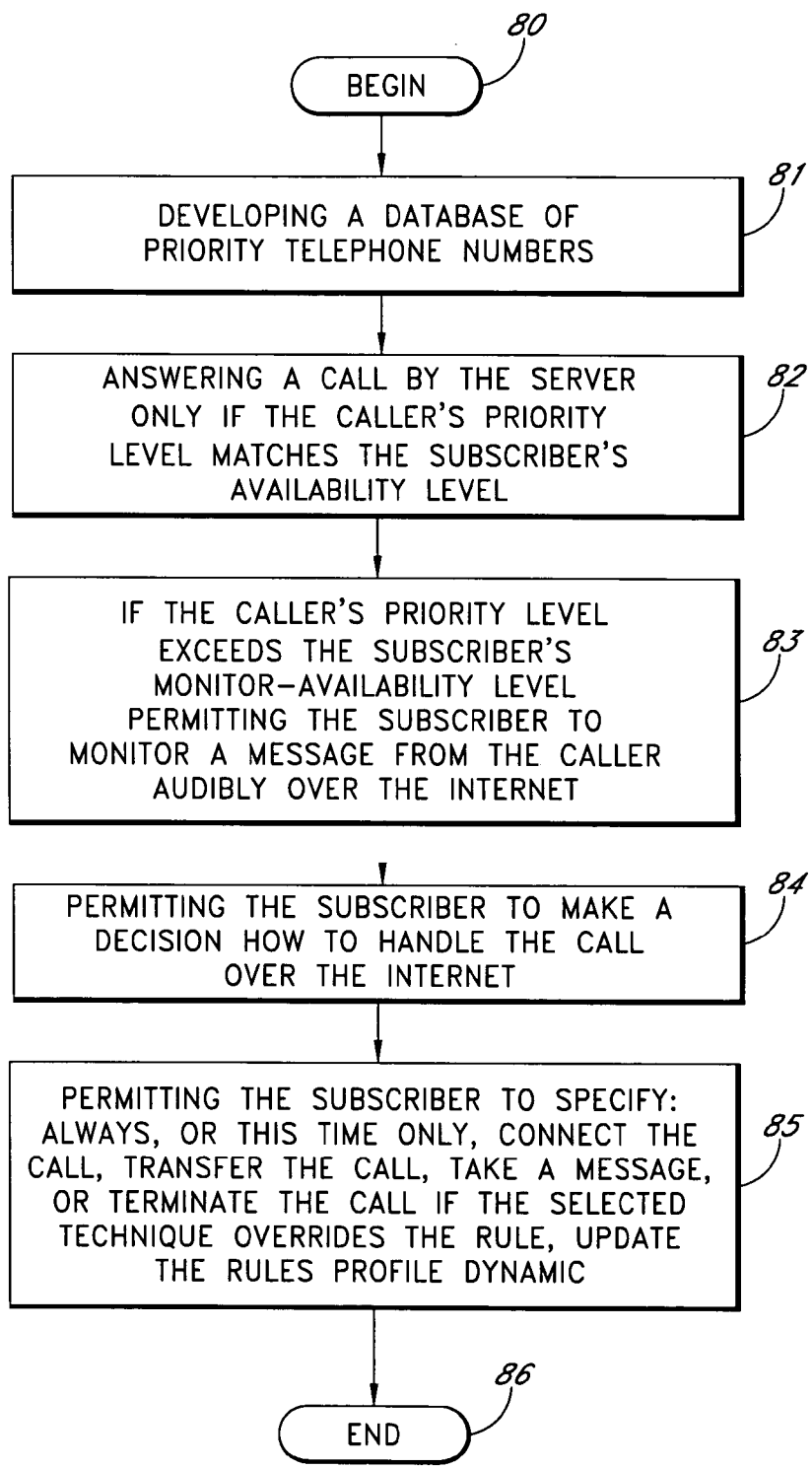
FIG. 11 is a flow chart for steps in deciding how the subscriber answers a call.

As has been indicated hereinbefore, an audible message from the caller may be played to the subscriber to aid him in making a decision for handling the call. However, the subscriber may also record messages, and these messages may be played to the caller as well. There may be a number of different messages depending upon the circumstances, and these may be selectively played as desired. Referring now to FIG. 10, there is shown a sequence of steps in a flow chart. Block 74 is "begin". Block 75 is "recording a plurality of different audio greetings". Block 76 is "storing said audio greetings in a memory storage device". Block 77 is "playing a preselected one of said audio greetings to a caller on demand". Block 78 is "end". Referring now to FIG. 11, this figure shows a flow chart for steps in deciding how the subscriber answers a call. The first block 80 is "begin". Block 81 is "developing a data base of important telephone numbers". Block 82 is "answering a call by the server only if the line is busy and the caller number is in the data base". Block 83 is "permitting the subscriber to monitor a message from the caller audibly over the Internet". Block 84 is "permitting the subscriber to make a decision how to handle the call over the Internet". Block 85 is "permitting the subscriber to specify: always, or this time only, connect the call, transfer the call, take a message, or terminate the call". Block 86 is "end".

Figure 12:
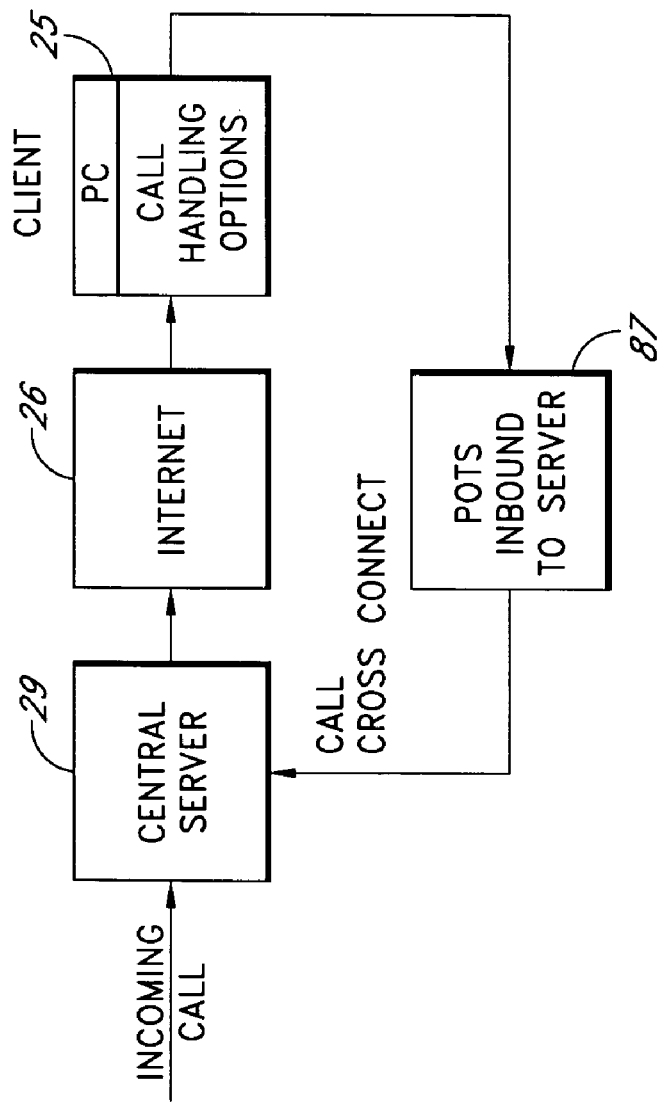
FIG. 12 illustrates calling back into the central server while an incoming call is being held at the server.

The client or subscriber has many ways to deal with an incoming call. He can elect not to answer and to take a message, or he can have the call played through the personal desktop computer 25 and talk to the caller via the Internet 26, or he can have the call transferred to a different instrument such as a second telephone 24 (FIG. 1) or a cell phone 45 (FIG. 5). There is another way for the subscriber to handle a call. While the central server 29 is holding the call, the client can pick up a cell phone or a regular POTS phone and call in to the central server 29 and have a call cross-connect right there. This is illustrated in FIG. 12. This FIG. illustrates an incoming call arriving at the central server 29. It is connected to the Internet 26 and to the client's personal desktop computer 25. Then, the client may elect to make a POTS inbound call to the server 87. This means, for example, picking up a cell phone or a regular POTS phone and dialing the number to the central server 29. At the central server 29, a call cross-connect is made, and the client can talk to the caller making the incoming call.

Figure 13:
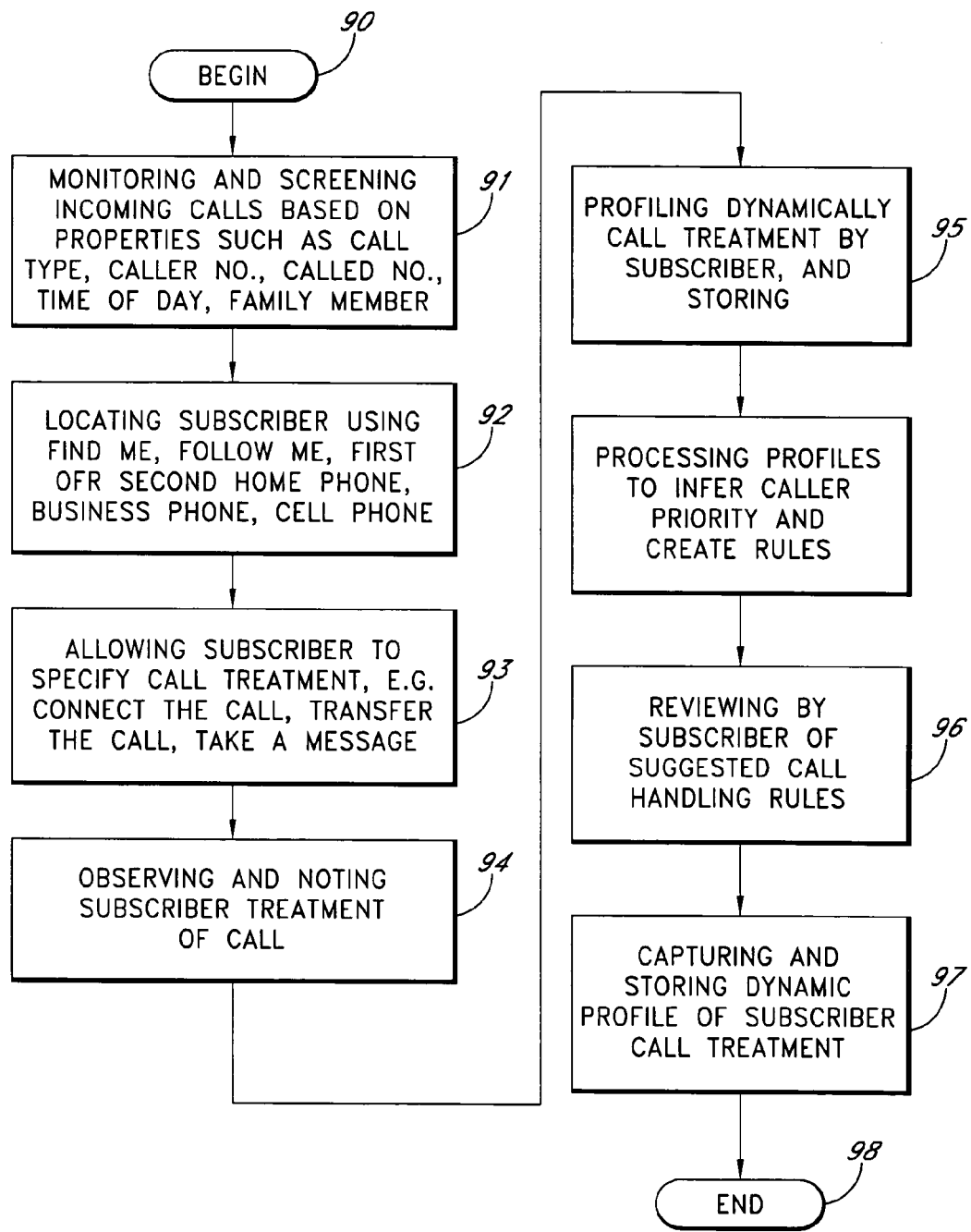
FIG. 13 is a sequence of steps in a method flow chart illustrating capturing the dynamic profile of a subscriber.

The central server 29 is able to capture and store the dynamic profile of the subscriber's rules for treatment of incoming calls. This is illustrated in FIG. 13. FIG. 13 is a sequence of steps in a method flow chart. Block 90 is "begin". Block 91 is "monitoring and screening incoming calls based on properties such as call type, caller number, called number, time of day, family member called". Block 92 is "locating subscriber using find me, follow me, first or second home phone, business phone, cell phone and various Internet devices". Block 93 is "allowing subscriber to specify call treatment, e.g., connect the call, transfer the call, take a message". Block 94 is "observing and noting subscriber treatment of call". Block 95 is "profiling dynamically call treatment by subscriber". Block 96 is "reviewing by subscriber of suggested call handling rules". The subscriber is not asked to enter his rules for handling calls but rather the subscriber is presented with rules determined implicitly by the central server 28. The subscriber then has an opportunity to approve or to reject the proposed rules. Block 97 is "capturing and storing dynamic profile of subscriber call treatment". This dynamic profile may be stored in the message store memory 33 of the central server 28. In addition an address book may be compiled at that same location so that if the subscriber wishes to place a call, or to return a call following a telephone message, it is easy to initiate using the numbers logged in the address book in the message store memory 33 of the central server 28. In FIG. 13, the last block 98 is "end".

The central server 28 of the system of the present invention gradually becomes more useful to the subscriber as it learns the subscriber's profile. This profiling also adds another dimension to the system of the present invention. This is an advertising or media dimension. The profiling creates a community of users. People that call each other on the telephone have a community of interests. Thus the profiling information that is stored becomes, in effect, a collaborative filter based on telephone numbers. Recording of calls made to other numbers indicates similar patterns of behavior. This is based on shared interests. Thus, this gradual interactive development of a profile based on decisions made by the client may be used for advertising purposes, if desired.

Figure 14:
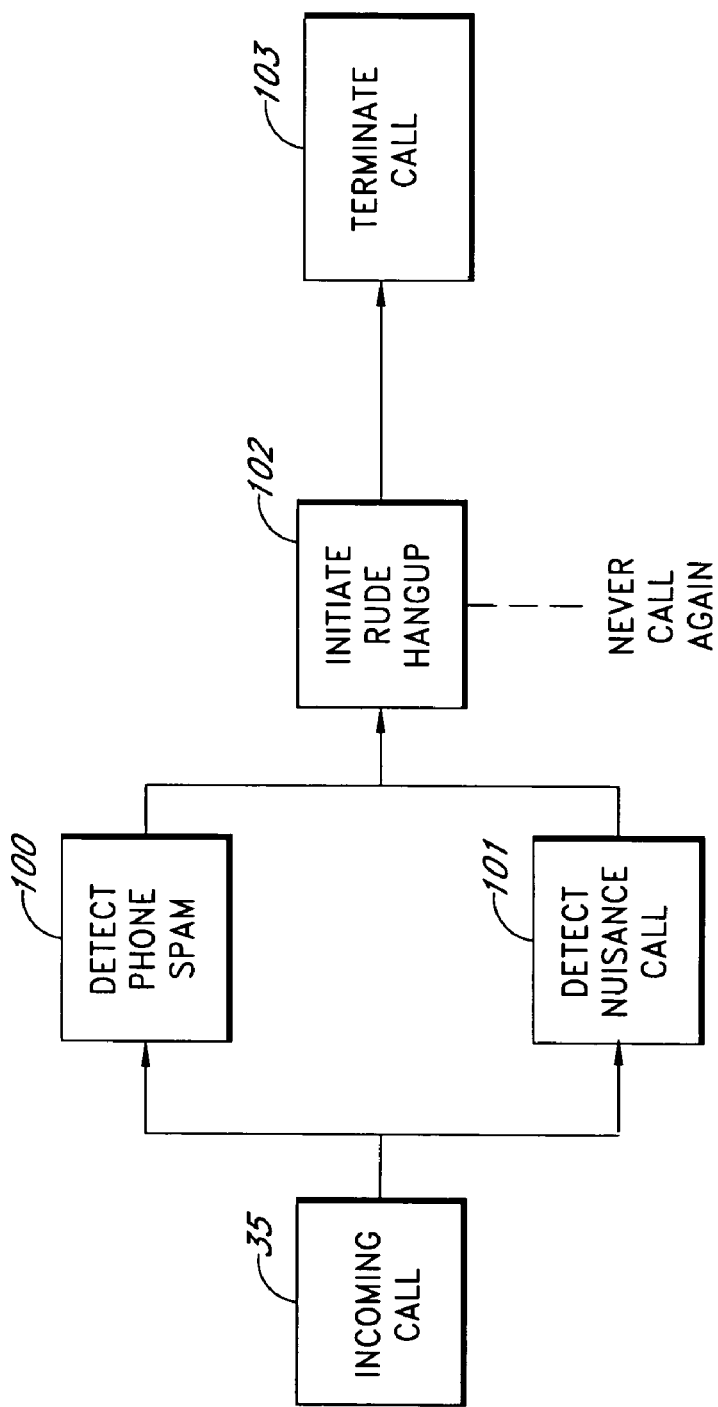
FIG. 14 is a schematic diagram indicating how the system can handle undesired incoming calls.

FIG. 14 is a schematic diagram indicating how the system can handle undesired incoming calls. At the left of FIG. 14 there is illustrated an incoming call 35. The call is coupled to a detector for detecting phone "spam" 100. The incoming call 35 is also connected to a detector for detecting nuisance calls 101. Both of these types of telephone calls are unsolicited, unwanted, and undesirable types of calls. When these types of calls are detected, they are forwarded to block 102 which initiates a "rude" hang-up. This type of hang-up would have an audible message to the caller saying something such as "never call again". Then, the signal is passed on to block 103 which terminates the call.

Typically, the system only answers calls for the client when the client's telephone line is busy and he is logged on the Internet. However it can be arranged for the system to answer all of the client's incoming calls. This is illustrated in FIG. 15.

Figure 15:
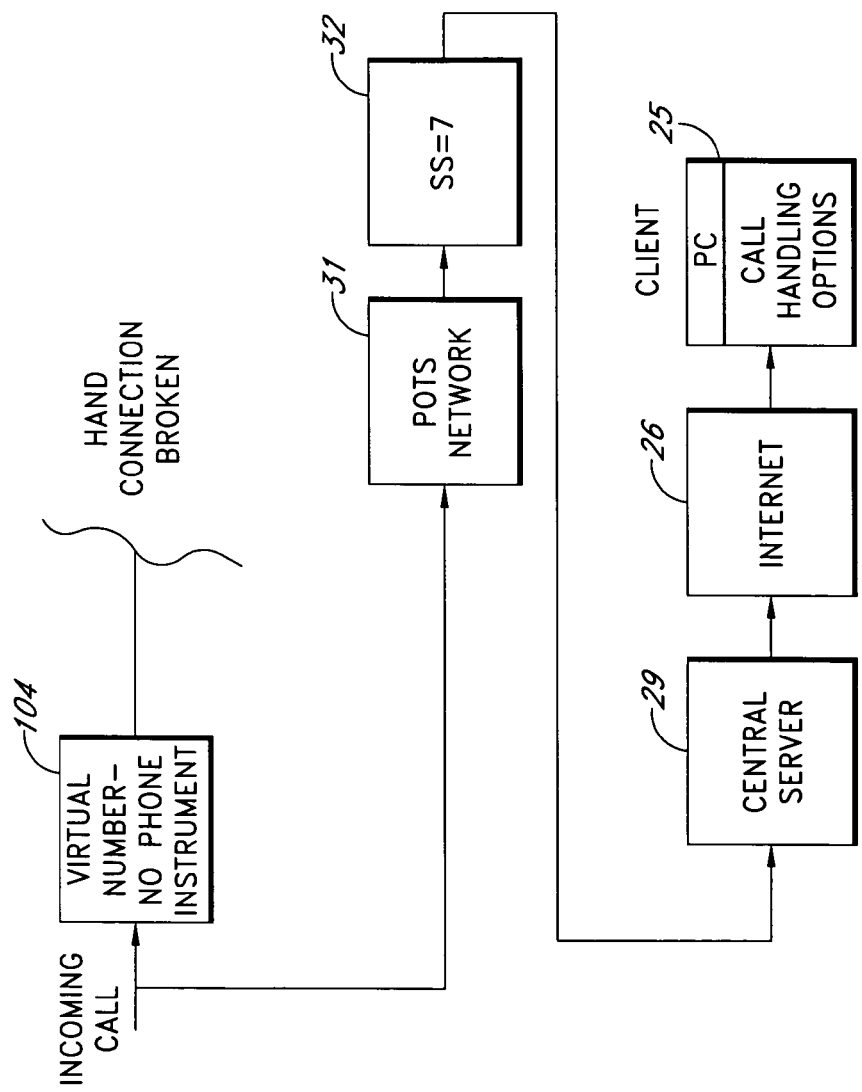
FIG. 15 is a schematic diagram illustrating a second embodiment of the call control system of the present invention.

FIG. 15 is a schematic diagram illustrating a second embodiment of the call control system of the present invention. In this embodiment of the invention, the hard connection from the POTS to the subscriber is broken. This is done by the central server system providing a virtual phone number to the client without providing a telephone instrument. This is illustrated in block 104. The virtual telephone number is given to the client who optionally uses it in his advertising so that all calls will be made to that number but in fact those calls will be intercepted by the system of the present invention.

NEW: Advantageously, the system discussed above has access to call signaling information, such as SS7 signaling information or VoIP Session Initiated Protocol (SIP) signaling information, including caller ID information. For example, in one embodiment the system described above can appear to be a central office to the telephone companies. The system can optionally be or act as a class 5 telephone office. As previously discussed, when an incoming call comes in, the system may prompt a caller to unblock the caller's telephone number before proceeding with recording a message from the caller. In addition, as previously discussed, the system can also identify a first entity placing a call by providing voice prompts to the first entity and receiving tone responses from the first entity by which the first entity identifies their number, or by capturing an audible signal from the first entity.

Advantageously, the caller is not required to first hang up, then take the phone off hook, enter an unblocking code, and then dial the called number again to unblock the caller's phone number and place the call. Instead, a caller can change the caller ID designation from 'private' or restricted, to 'not private' or restricted during the call, thereby unblocking the caller ID, so that the caller does not have to place a new call to unblock the caller ID.

By way of further background, calls can have caller identification information, such as caller ID Automatic Number Identification, available, wherein the caller ID phone number, name, or other appropriate caller identifier is supplied by the switch or other device with the call. For example, as discussed above, the caller phone number can be provided via associated call signaling information. Even if the caller ID is available as part of the call signaling information, the caller ID may still be marked as private or restricted, wherein it is not to be revealed to the person receiving the call.

In addition, the availability of the caller ID may be a function of the telephone network capability and can be independent of whether the caller ID is private or not. Thus, if the caller ID is not supplied with or in association with the call, the caller ID is considered unavailable. If the caller ID is available and not private or not restricted, then the caller ID may be revealed to the person receiving the call.

For example, if a caller ID is available and not private, then the caller ID can be shown or presented to the person receiving or intended to receive the call via an appropriate display, such as a caller ID display provided on a user computer system, on a wired or wireless phone terminal, or otherwise. If a caller ID is not available or private, then the caller ID is not shown or presented to the person receiving or intended to receive the call, although the caller ID may be available depending on the signaling to the switch or other appropriate and authorized call processing system processing the call.

In an example embodiment, subscribers or other allowed users can use a privacy treatment manager to control the call handling of calls to the user based on certain caller ID or call identifier related parameters. For example, a user can specify certain call treatment for calls having their caller ID blocked, wherein the caller ID is designated as private, as well as for calls having an unavailable caller ID, wherein the caller ID was not supplied with the call (as opposed to supplied, but marked private).

For example, users can control how restrictive they want the system to be with calls of this type. Users can have the central server or other call processing system embodiment either request or require the caller to reveal or unblock their caller ID, and/or other identifier associated with the caller or calling terminal, before: recording a message; providing the called party with a notification regarding the call; and/or forwarding the call to a wired, wireless, or other telephone terminal associated with the called party. By way of illustration, if the user has specified that the caller ID is required to be available, then the unblocking of a private caller ID may be required as a precondition for recording a message from the caller, providing the called party with a notification regarding the call, and/or forwarding the call to a wired, wireless, or other telephone terminal associated with the called party. Further, a user can specify that if the caller ID is private, the call is to be terminated without providing the caller with the option of unblocking the caller ID during the call.

By way of further illustration, if the user has specified that the caller ID is requested to be made available, then the unblocking of a private caller ID may be requested, but not required, prior to: recording a message from the caller; providing the called party with a notification regarding the call; and/or forwarding the call to a wired, wireless, or other telephone terminal associated with the called party.

A given user or subscriber can have the privacy manager enabled or disabled by the user and/or by the call processing system operator.

Figure 16:
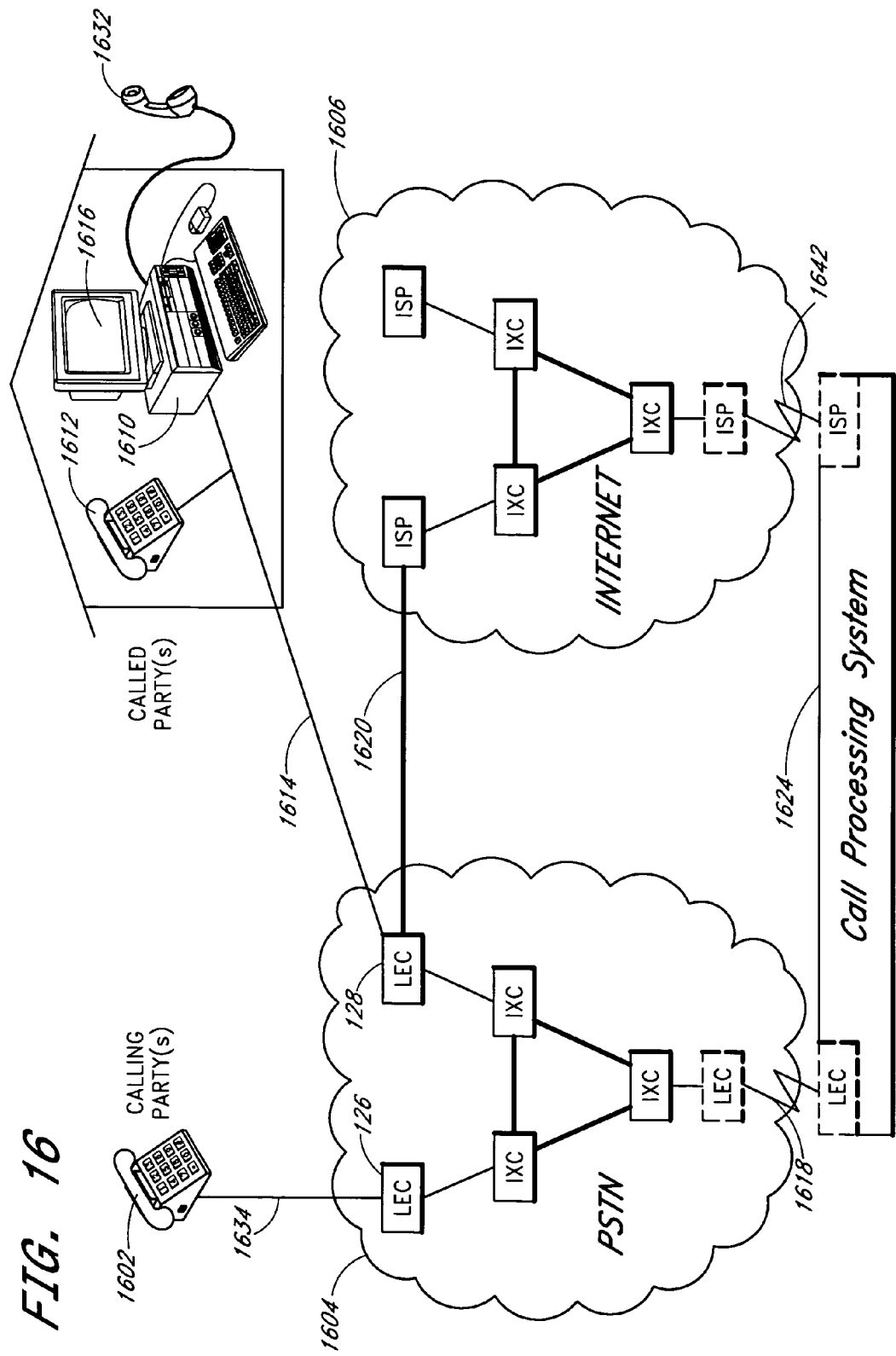
FIG. 16 illustrates another example telecommunications system.

For example, the privacy manager can be used with the embodiments discussed above, the embodiments illustrated in FIGS. 16 and 17, or other embodiments. As illustrated in FIG. 16, another example telecommunications system includes:

- a plurality of user telephone stations 1602, 1612.
- a plurality of user computer terminals 1610.
- a call processing system 1624 that answers and process calls and interacts with subscribers, such as over a network via a client application, and/or otherwise.

These devices are linked together in this example using various line and trunk circuits to a Public Switched Network (PSTN) 1604 and to a common data network, such as the Internet 1606.

Figure 17:
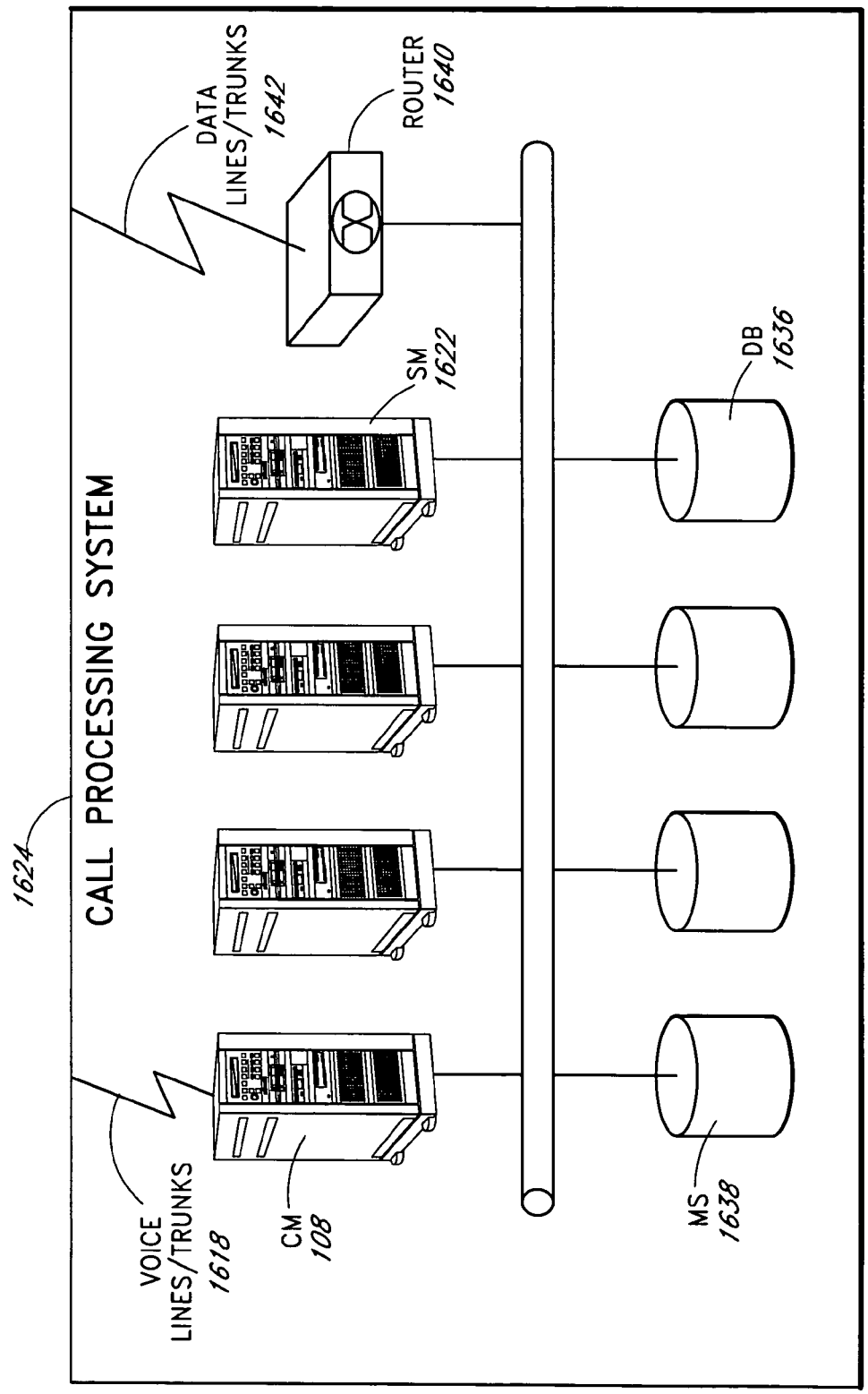
FIG. 17 further details subsystems included in the call processing system depicted in FIG. 16.

FIG. 17 further decomposes the example call processing system 1624 into its functional components, although these components can be combined into fewer components, divided into additional components, or otherwise configured:

- a Call Management (CM) subsystem 1608, which serves as the interface to the PSTN 1604 to manage inbound and outbound telephone calls.
- a Router subsystem 1640, which serves as the interface to the Internet 1606 to manage communications between online IP client devices and the various call processing servers.
- an online presence detection Internet Session Management (SM) subsystem 1622, which monitors the status of subscriber data terminals to determine availability for call handling services.
- a shared Media Storage (MS) subsystem 1638, which persistently archives the caller's voice messages and the called party/subscriber's personal greeting(s).
- a Call Processing Database (DB) subsystem 1636 in which called party/subscriber service parameters are stored, including configuration rules governing the automatic call handling treatment, the privacy management parameters discussed herein, and subscriber electronic phone books (including one or more of the names, phone numbers, addresses, email addresses, and other information for the subscribers friends, business associates, and other contacts).

Theses various subsystems are interconnected via a Local Area Network (LAN) and/or via a Wide Area Network (WAN).

Referring back to FIG. 16, the user telephone stations 1602, 1612 in this example, are respectively connected to local exchange switches 1626, 1628 via telephone lines 1634, 1614. The stations 1602, 1612 can optionally be conventional POTS (Plain Old Telephone Service) telephones or local extensions behind a corporate Private Branch Exchange (PBX), or can be wireless cellular phones connected via a cellular or other wireless network.

The telephone stations 1602, 1612 can be coupled to the same switch or different switches. If the telephone stations 1602, 1612 are coupled to the same switch, the switch will be local to both the calling and called parties, such as for intra-LATA or local calls. If telephone stations 1602, 1612 are coupled to different switches, each switch may be local only to one of the parties, as is the case for non-local calls such as inter-LATA (long-distance) calls. The PSTN can be configured to handle mobile, wireless stations via wireless communications towers configured to broadcast and receive cellular radio frequency communications. The wireless towers can be, for example and without limitation, CDMA or GSM cellular mobile base stations.

In the illustrated embodiment, the CM subsystem 1608 is coupled into the PSTN 1604 through voice trunk circuits 1618 optionally directly interfacing with the Inter Exchange Carrier's (IXC) circuit switched or packet switched telephony network. Thus, advantageously the call processing system 1624 does not have to be directly serviced by the same Local Exchange Carrier's (LEC) switch or PBX as the calling or called terminals 1602 and 1612. Indeed, the call processing system 1624 or its individual subsystem components can be located in a different country than the called and calling parties. In this instance, the call processing system 1624 is optionally configured as, or to appear as, a telephone end office and can interface with the PSTN 1604 as a Class 5 switch. In other embodiments, the call processing system 1624 is locally attached to a LEC switch with a physical line or local trunk interface circuit. This switch may or may not be serving telephone stations 1602 and/or 1612.

The voice trunk circuits 1618 are not limited to a particular signaling convention. For example, the present invention can be utilized with a Common Channel Signaling system, such as Signaling System 7 (SS7), having separate voice/user data and signaling channels. In addition, the present invention can be used with other signaling methods, such as the following trunk-side signaling interfaces: ISDN-PRI; Advanced Intelligent Network; VoIP/SIP and/or Service Node architectures. Preferably, the selected signaling system provides a suite of call presentation information to the call processing system 1624, including one or more of:

ANI—Automatic Number Identification: phone number and privacy indicator of the calling party ("Caller-ID").

DNIS—Dialed Number Identification: phone number of the call processing system's voice trunks 1618 that the call was forwarded to.

OCN—Original Called Number Identification: phone number of the original called party (who can be a subscriber to services provided by the call processing system).

Call Type—Forwarded call due to a BCF, RNA, or DND/CFA condition. In addition, directly dialed inbound calls can be handled as well. In this instance, the caller will be required to implement a second stage of dialing to enter the subscriber's phone number or the subscriber could be assigned a unique personal number that is directly dialed by their callers.

The telephone lines 1634, 1614 may optionally be shared with one or more computer terminals. For example, telephone terminal 1612 shares the telephone line 1614 with a computer terminal 1610. While in the illustrated example the computer terminal 1610 is a personal computer, the computer terminal 1610 can be an interactive television, a networked-enabled personal digital assistant (PDA), other IP (Internet Protocol) device, or the like. Alternatively, the computer terminal 1610 can be a personal computer having a monitor, keyboard, a mouse, a disk drive, a sound card or similar sound reproduction circuitry such as a codec, streaming media playback software, such as the Media Player program available from Microsoft, speakers, and a modem, such as a standard V.90 56K dial-up modem. The modem can optionally be configured to dial-up a number under control of an application, such as a contact manager application or telecommunications client application phone dialer, stored and executing on the computer terminal 1610.

The telephone line 1614, can be used to establish a dial-up connection for computer terminals, such as terminal 1610 via the computer modem, to an Internet Service Provider (ISP) offering dial-in remote access service connections from the PSTN 1604 via trunk interface circuits 1620. The computer terminal 1610 can also be connected to the Internet 1606 via a broadband connection, such as a DSL line, a television cable line, or a T1 line.

In addition, the computer terminal 1610 can be equipped with a Voice over Internet Protocol (VoIP) software module and a headset or a handset 1632, including a microphone and speaker, allowing voice communications to be conducted over a computer network, such as the Internet 1606. VoIP communicates information via packet switching, which opens a connection just long enough to send a small packet of data. Each packet includes a destination address informing the network where to send the packet along with the actual voice data payload. If the receiving station is also a VoIP terminal, then when the receiving terminal receives the packets, VoIP software executing on the receiving terminal reassembles the packets into the original data stream. The data stream is then converted to a voice signal. If the receiving station is a conventional telephone, then a VoIP gateway converts the packets into a voice signal that is then connected to the PSTN 1604.

In one embodiment, the VoIP process is performed using the ITU-T H.323. Alternatively, the Session Initiation Protocol (SIP), established by the Internet Engineering Task Force (IETF), can be used. SIP may be more efficient than the H.323 protocol as SIP is specifically intended for IP telephony. Alternatively, proprietary protocols could be deployed where multi-vendor interoperability is not required.

Optionally residing and executing on the computer terminal 1610 is a communications management Client application 1616, which can optionally be the Command Center 25 discussed above. The Client application 1616 is used to provide enhanced communication services, as discussed in greater detail herein. The Client application 1616 is connected to and communicates with the call processing system 1624 via the Internet 1606, other public wide area computer networks, other network, or the like.

The call processing system 1624 optionally hosts a Web site used by subscribers of the services provided by the call processing system (such as call answering services) to setup and manage their accounts, to view information about incoming calls, and to instruct the call processing system 1624 on how to route incoming calls to one or more destination stations. Many of these same functions can be implemented by the Client application 1616 as well.

In one example embodiment, the call processing system 1624 allows a called party to monitor a message being left by a caller even when the called party's line is unavailable, for one or more reasons, such as because the line user is connected to the Internet over a dial-up connection. Optionally, calls to the user's phone number can be forwarded to the call processing system 1624 using the called party's local phone company's fixed and variable call forward functions or otherwise. These functions can include, by way of example, call forwarding on busy, call forwarding on ring-no-answer, and call-forward-all calls (sometimes called do-not-disturb). The call processing system 1624 answers the forwarded calls and plays a greeting to the caller. In addition, to receiving forwarded calls for a called party, the call may have been placed by the caller to a virtual telephone line or a number associated with the called party, wherein when a call is placed to that number, the call is optionally connected to the call processing system 1624.

The CM subsystem 1608 manages communications with the Client application 1616 and with forwarded calls or calls placed to a virtual telephone line or a number. The CM subsystem 1608 can interact with callers and called parties through voice prompts, voice commands, and/or DTMF (dual tone multi frequency) touch-tone entries. The CM subsystem 1608 is optionally configured to perform additional functions, such as acting as a telephone answering system that answers calls, providing privacy management, playing outgoing greetings and announcements, recording incoming messages, and forwarding and bridging calls. In addition, the CM subsystem 1608 further provides a call screening process.

The SM subsystem 1622 monitors the Internet for online IP devices registered to service subscribers to determine their availability for handling inbound call screening and call handling services. When a user or subscriber connects to the Internet using, for example, a dial-up ISP, the Client application 1616 executing on the subscriber's computer terminal 1610 makes the subscriber's online presence known to the call processing system 1624. Presence detection can be performed by the SM subsystem 1622 polling or pinging the computer terminal 1610 via the telecommunications Client application 1616, or by the telecommunications Client application 1616 transmitting a "Login/I'm alive" message and subsequent periodic "keep alive" messages to the SM subsystem 1622. Just prior to the normal termination of the online Internet session, the Client application 1616 sends a "Logout" message to the SM subsystem 1622. Abnormal Internet session termination conditions are detected by the SM subsystem 1622 timing out the expected Client "Keep alive" message.

If, rather than using a dial-up connection, the user or subscriber is using a broadband, always on-connection, such as via a DSL line or cable modem, the Client application 1616 optionally becomes active when the computer 1610 is turned on or powered up and stays on until the user manually shuts down the Client application 1616, or the computer 1610 is turned off or powered down.

In one example embodiment, the call answering system 1624 allows a called party to monitor a message being left by a caller even when the called party is connected to the Internet over a dial-up connection. Calls can be forwarded to the call processing system 1624 from the called party's line or the call may have been received at the call processing system 1624 via a call to a virtual phone number. The call processing system can answer the calls, play an appropriate greeting to the caller, as described herein. Optionally, at the same time, a communication channel is opened with the called party over the public Internet or other network, and speech is "streamed" to the called party and played over the speakers of the called party's computer, which may be, by way of example, a personal computer or networked television. With streaming, a client application executing on the called party's computer can start playing the transmitted speech data in substantially or almost real-time, before an entire speech data file of a caller's message has been transmitted. In particular, the Internet channel is opened at the time a call arrives at the call answering system so the called party hears the caller's speech during the playing of the greeting.

The call processing system 1624 can also optionally download messages recorded by callers to the subscriber's computer terminal 1610 and can generate or update a Client application call log, which lists the calls handled by the call processing system 1624 for the called party. The message is optionally archived in the MS subsystem 1638 and is also available locally on the computer terminal 1610 for playback at the called party's convenience.

Figure 18:
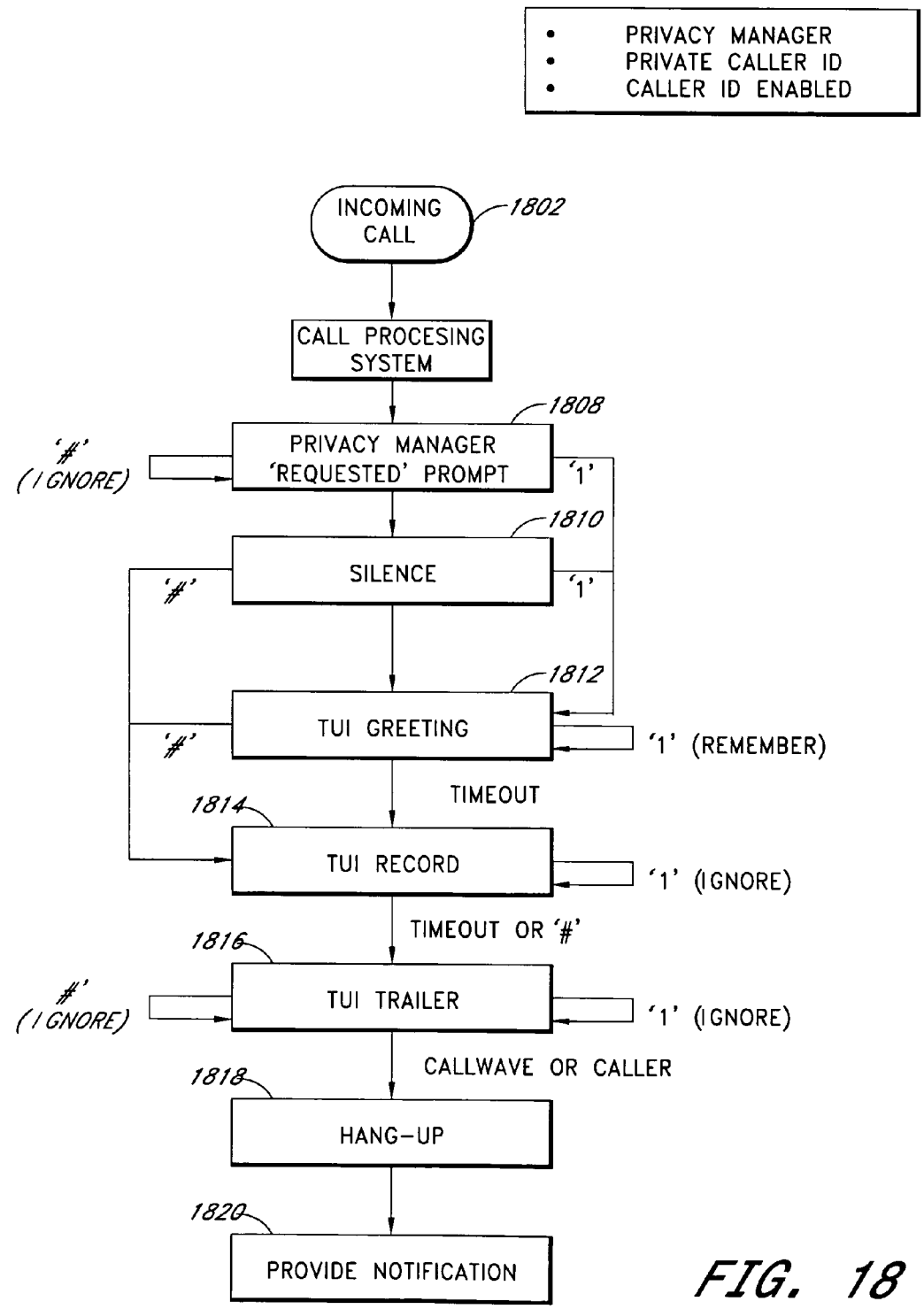
FIG. 18 illustrates an example call handling process where the called party has specified that caller identification information is to be requested.

With reference to FIG. 18, if a subscriber or other call party has specified that, in the case where a caller has caller ID blocking on, the caller is to be requested to unblock their caller ID. At state 1802, an incoming call is received by a call processing system, such as those illustrated in FIG. 1 or 16, and a determination is made as to whether the caller ID is available, unavailable, private, or not private. In this example, a determination is made that the caller ID is available and private. The call may have been forwarded to the call processing system as discussed above, the call may have reached the call processing system via a call to a virtual phone number associated with the called party, or the call may have been placed to a general phone number associated with the call processing system, wherein the caller is prompted to enter the number of the person they are trying to call.

At state 1808, a determination is made from parameters retrieved from the call processing database as to whether the called party has enabled the privacy manager, and if so, whether the subscriber has specified that caller ID (or other identification information) is requested or required. In this example, the called party has specified that caller ID is requested, and the privacy manager provides a caller ID request prompt. For example, the prompt can request the caller to press a designated single key or multiple keys (such as the '1' key or a '1' key press followed by a '2' key press), or a voice response, to unblock their caller ID. By way of illustration, the prompt can recite "The person you are calling has requested to see your caller ID. To send your caller ID, please press one." The process then proceeds to state 1810.

If the caller presses the '1' key (or other designated response) while the prompt is being played or in state 1810, the caller's caller ID will be unblocked and not considered private for the current call, and the process proceeds to state 1812. At state 1812, a telephone user interface (TUI) greeting is played to the caller. In this example, a '#' key press by the caller is ignored during the unblocking request prompt. For example, the prompt can recite "Hi. The person you are calling is using Callwave.com's Internet Answering Machine call processing service. Please leave a brief message after the tone. Press pound or hang-up when you are finished leaving your message."

Alternatively, at state 1808, if the called party has specified that incoming calls are to be forwarded to one or more specific phone numbers (which also includes VoIP terminal identifiers), the call processing system places an outcall (or outcalls) to the specified phone number(s), with the caller's caller ID provided in the outcall caller ID (ANI) field, and then bridges the caller's inbound call with the outcall. The following message recording states are not performed in this instance.

If the user did not provide an unblocking instruction at state 1808 while the prompt is playing or after a timeout (such as 3 seconds or other designated time period), the caller's caller ID is treated as private for the current call and the process proceeds to state 1812. The system can optionally store the caller ID release instruction such that future calls from this unblocked number will be automatically released. Optionally, the caller may be asked to grant permission to the system to automatically release the unblocked number for future calls, where such permission is stored in system memory.

If the caller presses the '#' key during state 1808 or 1810, the process substantially immediately advances to the greeting state 1812. This reduces the wait time for a caller before the caller's greeting is played in state 1812.

If at state 1812, the caller presses the '1' key (or other designated response), the caller's caller ID is treated as not private for the current call. If the caller presses the '#' (skip ahead) key during the greeting state 1812, the process proceeds substantially immediately to state 1814.

If the caller did not press the '1' key or the '#' at state 1812 after the greeting and record tone is played, the process proceeds to record state 1814. At state 1814, the call processing system records a message from the caller. Optionally, after determining that the client application is online, a communication channel is opened with the called party over the public Internet and the caller's message is "streamed" to the called party via the client application, and played over the speakers of the called party's computer, which may be, by way of example, a personal computer or networked television. With streaming, a client application executing on the called party's computer can start playing the transmitted speech data in substantially, or almost real-time, before an entire speech data file of a caller's message has been transmitted. In addition, if the caller has unblocked the caller's caller ID, then the caller's phone number, name, or other identifier is optionally presented to the called party via the client application in association with the streamed message.

If the called party wishes, the called party can instruct the call processing system to connect the called party to the caller via the computer system or telephone terminal.

Optionally, a key press of '1' will be ignored at recording state 1814, and a key press of '#' will signify end of recording and cause the process to proceed substantially immediately to trailer state 1816.

At trailer state 1816, the call processing system can play a good-bye or thank you prompt, such as "Thank you for leaving a message. The message will be provided to the called party. You may hang-up now." At state 1818, the call is terminated.

A notification can then be transmitted at state 1820 to the called party regarding the message. The notification can, for example, include the caller ID phone number or other caller identifier (if the caller unblocked the caller ID), as well as the time and duration of the call. The notification can be provided via the client application, email, instant messaging, voice delivery, and/or short messaging service (SMS) messaging to a personal computer, wireless phone, networked television, or otherwise. The called party can then access or retrieve the message. The information provided in the notification can also be provided when the called party retrieves the message.

Unless the caller instructs otherwise, the next time the caller calls, the number will be treated as private in accordance with the caller ID privacy designation. Optionally, the system can store the release instruction request and automatically release the caller ID on the next call.

If, at state 1802, a determination is made that the caller ID is unavailable, optionally, at state 1808 the caller can be requested to manually key in or speak the caller's phone number, or to provide other identification information. The remainder of the call processing can be similar to that described above with caller ID considered restricted.

If the caller was requested to unblock their caller ID but chose not to, then in this example the caller ID is not presented to the called party via the client application or otherwise. Optionally, in such an instance, a call log entry can be generated and presented to the called party, via the client application or otherwise, indicating as appropriate: that a call was received with a private or restricted phone number and that a message was left; or that a call was received with a private or restricted phone number and that no message was left, depending on whether or not a message was recorded.

Similarly, if the caller's caller ID was unavailable, and the caller was requested to otherwise provide the caller's phone number or caller identification information but chose not to, then optionally, a call log entry can be generated and presented to the called party, via the client application or otherwise, indicating as appropriate: that a call was received with caller ID unavailable and that a message was left; or that a call was received with caller ID unavailable and that no message was left, depending on whether or not a message was recorded.

Figure 19:
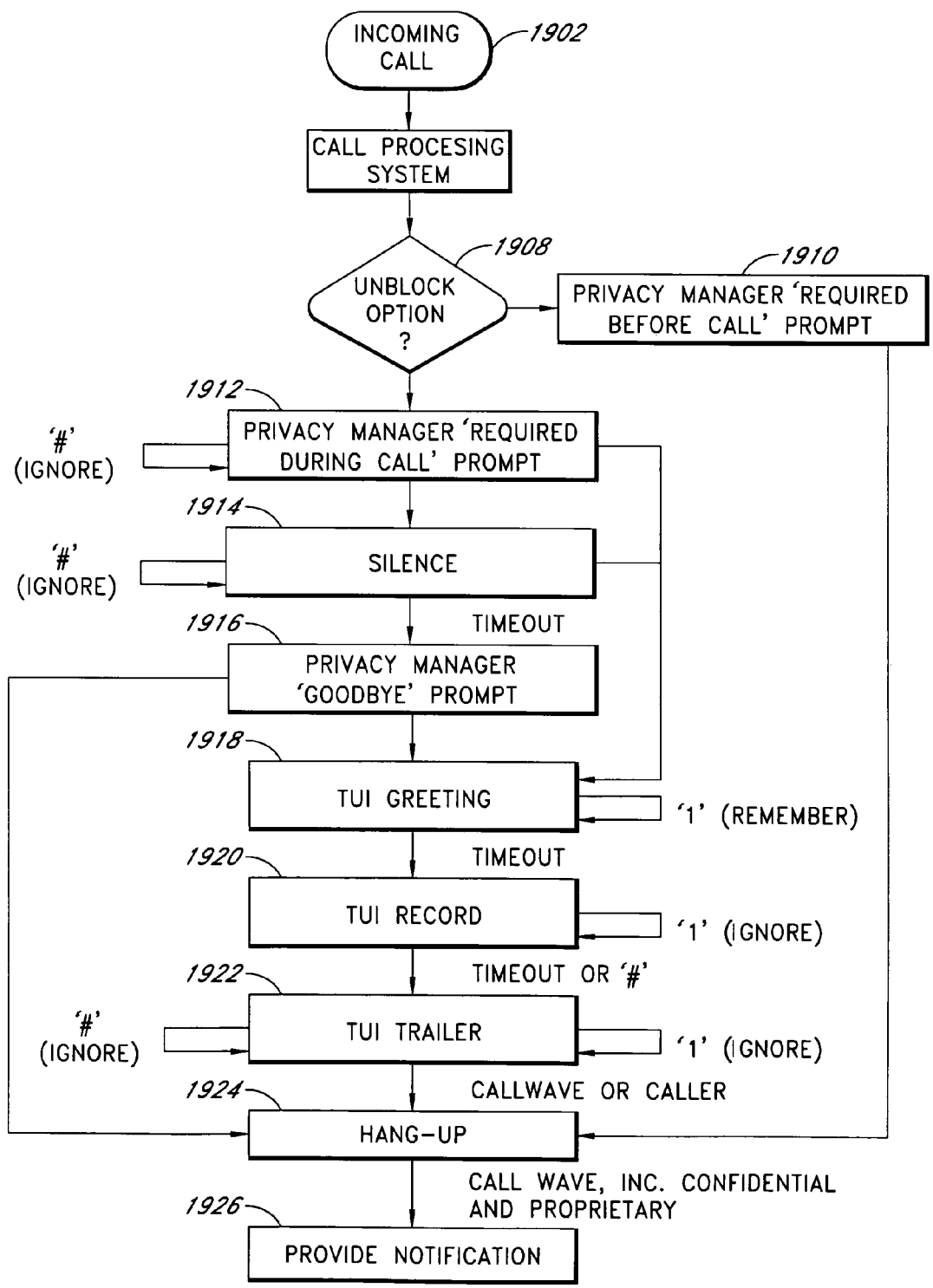
FIG. 19 illustrates an example call handling process where the called party has specified that caller identification information is required.

With reference to FIG. 19, if a subscriber or other call party has specified that, in the case where a caller has caller ID blocking on, the caller is to be required to unblock their caller ID, then the illustrated example process can be performed. At state 1902, an incoming call is received by a call processing system, such as that illustrated in FIG. 1 or 16, and a determination is made as to whether the caller ID is available, unavailable, private, or not private. In this example, a determination is made that caller ID is available and private. The call may have been forwarded to the call processing system as discussed above, the call may have reached the call processing system via a call to a virtual phone number associated with the called party, or the call may have been placed to a general phone number associated with the call processing system, wherein the caller will later provide information identifying the called party.

At state 1908, a determination is made from parameters retrieved from the call processing database as to whether the called party has enabled the privacy manager, and if so, whether the subscriber has specified that caller ID (or other identification information) is requested or required. In this example, the called party has specified that caller ID is required. A further determination can be made as to whether the called party specified that if the caller ID is private, the call is to be terminated without providing the caller with the option of unblocking the caller ID during the call, or whether the called party has specified that the caller is to be provided with the option of unblocking the caller ID.

If the called party specified that if the caller ID is private, the call is to be terminated without providing the caller with the option of unblocking the caller ID during the call, the process proceeds to state 1910. At state 1910, an "unblock before call" prompt is played informing the caller that the call needs to unblock their caller ID before calling this called party (for example, "The person you are calling does not accept calls without caller ID. Please unblock your caller ID by pressing *82 before you call this person. Goodbye."), and the call is ended at state 1924.

If a determination is made at state 1908 that the called party is to be provided the option of unblocking their caller ID during the call, the process proceeds to state 1912, and the privacy manager provides a caller ID required prompt. For example, the prompt can inform the caller that no message will be taken and/or that the caller will not accept the call unless the caller unblocks their caller ID by pressing a designated key, such as the '1' key, or a voice response, to unblock their caller ID. By way of illustration, the prompt can recite "The person you are calling does not accept calls without caller ID being unblocked. To send your caller ID, please press one." The process then proceeds to state 1914, unless the caller presses '1'.

If the caller presses the '1' key (or other designated response) while the prompt is being played or in state 1914, the caller's caller ID will not be considered private for the current call and the process proceeds to state 1918, and a telephone user interface (TUI) greeting is played to the caller. For example, the prompt can recite "Hi. The person you are calling is using Callwave.com's Internet Answering Machine service. Please leave a brief message after the tone. Press pound or hang-up when you are finished leaving your message."

Alternatively, at state 1918, if the called party had specified that incoming calls are to be forwarded to one or more specific phone numbers (which also includes VoIP terminal identifiers), the call processing system places an outcall (or outcalls) to the specified phone number(s), with the caller's caller ID provided in the outcall caller ID (ANI) field, and then bridges the caller's inbound call with the outcall. The following message recording states are not performed in this instance.

If the user did provide an unblocking instruction at state 1912 or 1914 while the prompt is playing or after a timeout (such as 3 seconds or other designated time period), the caller's caller ID is treated as unrestricted for the current call and the process proceeds to state 1918. As similarly discussed above, the caller can optionally specify that for future calls to the called party, the caller's caller ID should be automatically unblocked so that it can be presented to the called party. Thus, the caller can have caller identification information automatically unblocked for selected called parties, while the caller identification information will be blocked with respect to other called parties. If the caller does not press the '1' key within the configured time period, the caller's caller ID remains private and the process proceeds to state 19244 and a goodbye or call termination prompt is played. For example, the prompt can recite "We're sorry but we can't accept your call. Goodbye."

If the caller presses the '#' key during states 1912 or 1914, the process optionally ignores the key press.

At state 1918, a greeting message is played to the caller. For example, the prompt can recite "Hi. The person you are calling is using Callwave.com's Internet Answering Machine service. Please leave a brief message after the tone. Press pound or hang-up when you are finished leaving your message."

At state 1920, the call processing system records the message from the caller. Optionally, after determining that the client application is online, a communication channel is opened with the called party over the public Internet and the caller's message is "streamed" to the called party via the client application, and played over the speakers of the called party's computer, which may be, by way of example, a personal computer or networked television. With streaming, a client application executing on the called party's computer can start playing the transmitted speech data in substantially or almost real-time, before an entire speech data file of a caller's message has been transmitted. In addition to the caller's caller ID, the caller's phone number, name, or other identifier is optionally presented to the called party via the client application in association with the streamed message.

If the called party wishes, the called party can instruct the call processing system to connect the called party to the caller via the computer system or telephone terminal.

At trailer state 1922, the call processing system can play a good-bye or thank you prompt, such as "Thank you for leaving a message. The message will be provided to the called party. You may hang-up now." Optionally, key presses of '1' during states 1918, 1920, and 1922 are ignored. At state 1924, the call is terminated.

A notification can then be transmitted at state 1920 to the called party regarding the message. The notification can, for example, include the caller ID phone number or other caller identifier (if the caller unblocked the caller ID), as well as the time and duration of the call. The notification can be provided via the client application, email, instant messaging, voice delivery, and/or SMS messaging to a personal computer, wireless phone, networked television, or otherwise. The called party can then access or retrieve the message. The information provided in the notification can be also provided with the called party retrieves the message.

Unless the caller instructs otherwise, the next time the caller calls, the number will be treated as private in accordance with the caller ID privacy designation.

If, at state 1902, a determination is made that the caller ID is unavailable, optionally, at state 1912 the caller can be requested to manually key in or speak the caller's phone number, or to provide other identification information. The reminder of the call processing can be similar to that described above with respect to a private phone number.

If the caller was required to unblock or provide their caller ID but chose not to, then the caller ID is not presented to the called party via the client application or otherwise. Optionally, in such an instance, a call log entry can be generated and presented to the called party, via the client application or otherwise, indicating that a call was received with a private or restricted phone number and that no message was left, depending on whether or not a message was recorded, or optionally, the log will not contain an entry for the call.

With respect to FIGS. 18 and 19, if the caller ID was available, not private, or unblocked, then the caller ID information can be provided in the call log, with an indication as to whether a message was left.

The processes illustrated in FIGS. 18 and 19 can be applied for both domestic and international telephone numbers.

Optionally, a user can set the privacy parameters by accessing an appropriate form, such as a service configuration Web page. For example, the user can choose from and set one or more of the following options (with optional associated defaults):

Requested caller ID unblocking (default is off)
Required caller ID unblocking (default is off)
Allow caller ID unblocking during a call (default is on)
Require caller ID unblocking before a call (default is off)
Disable caller ID privacy management (default is on)

Once the user sets the above parameters, the setting is stored in the user account database and a Web page is then displayed confirming the setting.

Optionally, the call processing system can keep a Call Detail Record (CDR) for a call. For example, the CDR can record one or more of:

Caller ID disposition at the start of the call, i.e., whether the caller ID is private or not;

Caller ID disposition when the call is presented to the client application on the called party's computer system;

Whether or not the call was rejected because the caller ID was private and was not unblocked.

Thus, certain embodiments advantageously enable callers to unblock their caller identification during a call, rather than having to provide an unblocking code during the dialing process. The call treatment for a caller's call can then be selectively performed based at least in part, on whether the caller has unblocked the caller identification information.

Throughout the description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol), however, other standards can be used as well. It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networks of interactive televisions or of telephones, and other protocols may be used as well.

In addition, unless otherwise indicated, the functions described herein can be performed by executable code and instructions stored in computer readable memory and running on one or more general-purpose computers. However, the present invention can also be implemented using special purpose computers, state machines, and/or hardwired electronic circuits. Further, with respect to the example processes described herein, not all the process states need to be reached, nor do the states have to be performed in the illustrated order. Further, certain process states that are illustrated as being serially performed can be performed in parallel.

Similarly, while the examples herein may refer to a user's personal computer system, other computer or electronic systems can be used as well, such as, without limitation, an interactive television, a networked-enabled personal digital assistant (PDA), other IP (Internet Protocol) device, a cellular or wireless telephone, a web interface appliance, a networked entertainment device, and so on.

The present invention has been particularly shown and described with respect to certain example embodiments and features thereof. However, it should be readily apparent to those of ordinary skill in the art that various changes and modifications in form and detail may be made without departing from the spirit and scope of the inventions.

What is claimed is:

1. A method of processing calls having caller ID blocking, the method comprising:

receiving from a caller a first call for a called party, the first call including call signaling information, at a call processing system;

determining whether the call signaling information includes caller ID information;

if the caller ID information is private, during the first call instructing the caller to take a first action to unblock the caller ID information for the first call;

after the caller has performed the first action during the first call, providing at least a portion of the caller ID information to the called party; and receiving an indication from the caller during the first call that caller ID information associated with the caller can be provided to the called party for a future call from the caller.

2. The method as defined in claim 1, further comprising:
recording during the first call a voice message from the caller; and
providing the voice message to the called party in association with the caller ID information.

3. The method as defined in claim 1, further comprising forwarding the first call to the called party at least partly in response to determining that the caller has performed the first action during the first call.

4. The method as defined in claim 1, further comprising:
reading from a data store an indication as to whether the called party will not accept calls with blocked caller ID information; and
informing the caller that the called party will not accept calls with blocked caller ID information.

5. The method as defined in claim 1, wherein the first action is a single key press.

6. The method as defined in claim 1, wherein the first action is a key press or a spoken response.

7. The method as defined in claim 1, further comprising transmitting a notification regarding the first call to the called party, the notification including at least a portion of the caller ID information.

8. The method as defined in claim 1, further comprising transmitting a notification regarding the first call to the called party via SMS, the notification including at least a portion of the caller ID information.

9. The method as defined in claim 1, further comprising transmitting a notification regarding the first call to the called party to a client application executing on a computer associated with the called party, the notification including at least a portion of the caller ID information.

10. The method as defined in claim 1, wherein the first call was initially directed to first telephone line, and then forwarded to the call processing system.

11. The method as defined in claim 1, wherein the first call was placed to a virtual phone number associated with the called party.

12. A method of processing calls having caller ID blocking, the method comprising:
receiving from a caller a first call for a called party, the first call including call signaling information, at a call processing system;
determining whether the call signaling information includes caller ID information;
if the caller ID information is private, during the first call instructing the caller to take a first action to unblock the caller ID information for the first call;
after the caller has performed the first action during the first call, providing at least a portion of the caller ID information to the called party; and
at least partly in response to at least one caller action during the first call, storing in a data store a caller ID release authorization associated with the caller so that caller ID can be automatically provided to the called party in a future call.

13. A method of processing calls having private caller identification information, the method comprising:

receiving an indication from a user as to whether the user requires or requests caller identification information, and storing the indication in a data store;
receiving from a caller a first call for the user, the first call including call signaling information;
determining whether the call signaling information includes caller identification information;
determining whether the call signaling information indicates that the caller identification information is private;
retrieving the user indication from the data store;
if the caller identification information is private and the retrieved user indication indicates that the user requests or requires caller identification information, informing the caller that the user requests or requires caller identification information and instructing the caller to take a first action to allow the caller identification information to be provided to the user;
determining whether the caller has performed the first action during the first call;
if the caller has performed the first action during the first call, providing at least a portion of the caller identification information to the user; and
receiving an indication during the first call from the caller that caller identification information associated with the caller can be provided to the user for a future call from the caller.

14. The method as defined in claim 13, further comprising terminating the first call without recording a message from the caller at least partly in response to determining that the caller has not performed the first action within a first period of time.

15. The method as defined in claim 13, further comprising:
recording during the first call a voice message from the caller if the caller has performed the first action during the first call; and
providing the voice message to the user in association with the caller identification information.

16. The method as defined in claim 13, further comprising streaming a voice message from the caller to the user at least partly in response to the user performing the first action during the first call.

17. The method as defined in claim 13, further comprising forwarding the first call to the user at least partly in response to determining that the caller has performed the first action during the first call.

18. The method as defined in claim 13, wherein the first action is a single key press.

19. The method as defined in claim 13, wherein the first action is a key press or a spoken response.

20. The method as defined in claim 13, further comprising transmitting a notification regarding the first call to the user, the notification including at least a portion of the caller identification information.

21. The method as defined in claim 13, further comprising transmitting a notification regarding the first call to the user via SMS, the notification including at least a portion of the caller ID information.

22. The method as defined in claim 13, further comprising transmitting a notification regarding the first call to the user to a client application executing on a computer associated with the user, the notification including at least a portion of the caller identification information.

23. A method of processing calls having private caller identification information, the method comprising:
receiving an indication from a user as to whether the user requires or requests caller identification information, and storing the indication in a data store;

receiving from a caller a first call for the user, the first call including call signaling information;
determining whether the call signaling information includes caller identification information;
determining whether the call signaling information indicates that the caller identification information is private;
retrieving the user indication from the data store;
if the caller identification information is private and the retrieved user indication indicates that the user requests or requires caller identification information, informing the caller that the user requests or requires caller identification information and instructing the caller to take a first action to allow the caller identification information to be provided to the user;
determining whether the caller has performed the first action during the first call;
if the caller has performed the first action during the first call, providing at least a portion of the caller identification information to the user; and
at least partly in response to at least one caller action during the first call, storing in a data store a caller ID release authorization associated with the caller so that caller ID can be automatically provided to the user in a future call.

24. The method as defined in claim 13, further comprising:
receiving at the call processing system an instruction from a second user to refuse calls having private caller identification information;
receiving from a second caller a second call for the second user, the second call including call signaling information;
determining whether the call signaling information indicates that the caller identification information is not to be provided to the second user;
retrieving the second user instruction;
informing the second caller that the second user will not accept calls having blocked caller identification information; and
terminating the second call.

25. A method of processing calls having private caller identification information, the method comprising:
receiving from a caller a first call for a user, the first call including call signaling information;
determining whether the call signaling information includes caller identification information;
determining whether the call signaling information indicates that the caller identification information is restricted;
if the caller identification information is restricted, instructing the caller to take a first action so that the caller identification information can be provided to the user;
determining whether the caller has performed the first action during the first call; and
if the caller has performed the first action during the first call, providing at least a portion of the caller identification information to the user; and
receiving, during the first call, an indication from the caller that caller identification information associated with the caller can be provided to the user for a future call from the caller.

26. The method as defined in claim 25, further comprising terminating the first call without recording a message from the caller at least partly in response to determining that the caller has not performed the first action within a first period of time.

27. The method as defined in claim 25, further comprising:
recording during the first call a voice message from the caller if the caller has performed the first action during the first call; and
providing the voice message to the user in association with the caller identification information.

28. The method as defined in claim 25, further comprising forwarding the first call to the user at least partly in response to determining that the caller has performed the first action during the first call.

29. The method as defined in claim 25, wherein the first action is a single key press.

30. The method as defined in claim 25, wherein the first action is a key press or a spoken response.

31. The method as defined in claim 25, further comprising transmitting a notification regarding the first call to the user, the notification including at least a portion of the caller identification information.

32. The method as defined in claim 25, further comprising transmitting a notification regarding the first call to the user via SMS, the notification including at least a portion of the caller ID information.

33. The method as defined in claim 25, further comprising transmitting a notification regarding the first call to the user to a client application executing on a computer associated with the user, the notification including at least a portion of the caller identification information.

34. A method of processing calls having private caller identification information, the method comprising:
receiving from a caller a first call for a user, the first call including call signaling information;
determining whether the call signaling information includes caller identification information;
determining whether the call signaling information indicates that the caller identification information is restricted;
if the caller identification information is restricted, instructing the caller to take a first action so that the caller identification information can be provided to the user;
determining whether the caller has performed the first action during the first call; and
if the caller has performed the first action during the first call, providing at least a portion of the caller identification information to the user; and
at least partly in response to at least one caller action during the first call, storing in a data store a caller ID release authorization associated with the caller so that caller ID can be automatically provided to the user in a future call.

35. The method as defined in claim 25, further comprising:
providing a form to the user, wherein the user can specify whether the user requires or requests caller identification information;
receiving the user specification via the form; and
storing the user specification in association with user account information.

36. The method as defined in claim 25, further comprising:
receiving from a second caller a second call for the user, the second call including call signaling information;
determining whether the call signaling information associated with the second call includes caller identification information; and
if the caller identification information for the second call is unavailable, instructing the caller to take a second action to so that caller identification information associated with the second caller can be provided to the user.

37. A method of processing calls having private caller identification information, the method comprising:
- receiving from a caller a first call for a user, the first call including call signaling information;
- if the caller identification information associated with the first call is blocked, instructing the caller to unblock the caller identification information during the first call;
- after the caller has unblocked the caller identification information during the first call, performing a call processing action with respect to the first call; and
- at least partly in response to at least one caller action during the first call, storing in a data store a caller ID release authorization associated with the caller so that caller ID can be automatically provided to the user in a future call.

38. The method as defined in claim 37, wherein the call processing action is recording a caller message during the first call.

39. The method as defined in claim 37, wherein the call processing action is a call forwarding process.

40. The method as defined in claim 37, wherein the call processing action includes recording during the first call a voice message from the caller, and the method further comprising providing the voice message to the user in association with the caller identification information.

41. The method as defined in claim 37, wherein the caller is instructed to unblock the caller identification information by pressing one key.

42. The method as defined in claim 37, wherein the caller is instructed to unblock the caller identification information by performing a key press or by providing a spoken response.

43. The method as defined in claim 37, further comprising transmitting a notification regarding the first call to the user, the notification including at least a portion of the caller identification information.

44. The method as defined in claim 37, further comprising transmitting a notification regarding the first call to the user via SMS, the notification including at least a portion of the caller identification information.

45. The method as defined in claim 37, further comprising transmitting a notification regarding the first call to the user to a client application executing on a computer associated with the user, the notification including at least a portion of the caller identification information.

46. The method as defined in claim 37, further comprising receiving an indication from the caller that caller identification information associated with the caller can be automatically provided to the user for a future call from the caller.

47. The method as defined in claim 37, further comprising:
- providing a form to the user, wherein the user can specify whether the user requires or requests caller identification information;
- receiving the user specification via the form; and
- storing the user specification in association with user account information.

48. The method as defined in claim 37, further comprising:
- receiving from a second caller a second call for the user, the second call including call signaling information;
- determining whether the call signaling information associated with the second call includes caller identification information; and
- if the caller identification information for the second call is unavailable, instructing the caller to take a second action to so that caller identification information associated with the second caller can be provided to the user.

49. A computer readable medium having code stored thereon that, when executed, causes a computer to:
- receive signaling information associated with a first call from a caller for a user;
- if the caller identification information associated with the first call is blocked, instruct the caller to unblock the caller identification information during the first call; and
- after the caller has unblocked the caller identification information during the first call, perform a call processing action with respect to the first call,
- at least partly in response to at least one caller action taken during the first call, store in a data store a caller ID release authorization associated with the caller so that caller ID can be automatically provided to the user in a future call.

50. The computer readable medium as defined in claim 49, wherein the call processing action is recording a caller message during the first call.

51. The computer readable medium as defined in claim 49, wherein the call processing action is a call forwarding process.

52. The computer readable medium as defined in claim 49, wherein the call processing action includes recording during the first call a voice message from the caller, and wherein the code when executed, causes the computer to provide the voice message to the user in association with the caller identification information.

53. The computer readable medium as defined in claim 49, wherein the caller is instructed to unblock the caller identification information by pressing one key.

54. The computer readable medium as defined in claim 49, wherein the caller is instructed to unblock the caller identification information by performing a key press or by providing a spoken response.

55. The computer readable medium as defined in claim 49, wherein the code, when executed, causes the computer to transmit a notification regarding the first call to the user, the notification including at least a portion of the caller identification information.

56. The computer readable medium as defined in claim 49, wherein the code, when executed, causes the computer to transmit a notification regarding the first call to the user via SMS, the notification including at least a portion of the caller identification information.

57. The computer readable medium as defined in claim 49, wherein the code, when executed, causes the computer to transmit a notification regarding the first call to the user to a client application executing on a computer associated with the user, the notification including at least a portion of the caller identification information.

58. The computer readable medium as defined in claim 49, wherein the code, when executed, causes the computer to:
- provide a form to the user, wherein the user can specify whether the user requires or requests caller identification information; and
- store the user specification in association with user account information.

59. The computer readable medium as defined in claim 49, wherein the code, when executed, cause the computer to:
- receive call signaling information associated with a second call for the user from a second caller;
- determine whether the call signaling information associated with the second call includes caller identification information; and
- if the caller identification information for the second call is unavailable, instruct the caller to take a second action to so that caller identification information associated with the second caller can be provided to the user.

* * * * *

UNITED STATES PATENT AND TRADEMARK OFFICE
CERTIFICATE OF CORRECTION

PATENT NO.        : 7,688,958 B2                                Page 1 of 1
APPLICATION NO.   : 11/039374
DATED             : March 30, 2010
INVENTOR(S)       : Robert A. Dolan et al.

It is certified that error appears in the above-identified patent and that said Letters Patent is hereby corrected as shown below:

Column 22, line 66, In Claim 36, before "so" delete "to".

Column 23, line 61 (Approx.), In Claim 48, before "so" delete "to".

Column 24, lines 63-64, In Claim 59, before "so" delete "to".

Signed and Sealed this

Seventeenth Day of August, 2010

David J. Kappos
*Director of the United States Patent and Trademark Office*